United States Patent [19]

Hales

[11] Patent Number: 5,301,668
[45] Date of Patent: Apr. 12, 1994

[54] FIELD OF VIEW UNDERWATER DIVING COMPUTER MONITORING AND DISPLAY SYSTEM

[76] Inventor: Lynn B. Hales, 5633 Emigration Canyon Rd., Salt Lake City, Utah 84108

[21] Appl. No.: 718,281
[22] Filed: Jun. 20, 1991
[51] Int. Cl.⁵ .......................... A62B 7/04; A62B 9/00; G09G 3/02; G08B 25/00
[52] U.S. Cl. .......................... 128/205.23; 128/204.26; 128/205.22; 128/205.25; 128/200.24; 340/525; 2/428; 345/9
[58] Field of Search ...................... 128/204.21, 204.23, 128/205.22, 201.27, 205.25, 205.23, 204.26, 200.24; 340/525, 870.16, 705; 364/413.31; 2/428

[56] References Cited

U.S. PATENT DOCUMENTS

| | | |
|---|---|---|
| 3,712,714 | 1/1973 | Uyeda et al. ............................ 2/428 |
| 3,822,601 | 7/1974 | Borom . |
| 3,899,834 | 8/1975 | Harrison . |
| 4,005,282 | 1/1977 | Jennings . |
| 4,107,995 | 8/1978 | Ligman et al. . |
| 4,109,140 | 8/1978 | Etra . |
| 4,181,405 | 1/1980 | Cohen ............................ 128/205.23 |
| 4,212,258 | 7/1980 | Collins . |
| 4,250,626 | 2/1981 | Lazar . |
| 4,305,057 | 12/1981 | Rolston ............................ 340/705 |
| 4,307,449 | 12/1981 | Strubin . |
| 4,390,861 | 6/1983 | Cohen et al. ........................ 340/705 |
| 4,402,142 | 9/1983 | Dinsmore . |
| 4,586,136 | 4/1986 | Lewis . |
| 4,658,358 | 4/1987 | Leach et al. . |
| 4,694,583 | 9/1987 | Blaney . |
| 4,743,200 | 5/1988 | Welch et al. . |
| 4,755,023 | 7/1988 | Evans et al. . |
| 4,761,056 | 8/1988 | Evans et al. . |
| 4,782,338 | 11/1988 | Barshinger . |
| 4,791,729 | 4/1989 | Suda . |
| 4,796,365 | 1/1989 | Hudson . |
| 4,820,953 | 4/1989 | Saubolle et al. . |
| 4,869,575 | 9/1989 | Kubik . |
| 4,876,903 | 10/1989 | Budinger . |
| 4,882,678 | 11/1989 | Hollis et al. . |
| 4,939,647 | 7/1990 | Clough . |
| 4,949,072 | 8/1990 | Comerford et al. ............ 128/201.19 |
| 4,970,897 | 11/1990 | Budinger . |
| 4,999,606 | 3/1991 | Comerford et al. ............ 128/201.19 |

OTHER PUBLICATIONS

A Consumer's Guide to History, Theory, and Performance, DIVE COMPUTERS, By Ken Loyst, Watersport Publishing, Inc.
All Media Solid State Sensor Pressure Transducer, NOVASENSOR.
Holographic Mirrors, Application of Holography, SPIE, vol. 523 (1985) pp. 203-218.
Principles and Applications of Optical Holography, APPLIED OPTICS AND OPTICAL ENGINEERING, vol. VI, Chapter 9, pp. 357-391.
Holographic Optical Elements, TECHNICAL REPORT, LeRoy D. Dickson, TR 29.0364 Feb. 1983 (IBM) pp. 1-32.

Primary Examiner—Edgar S. Burr
Assistant Examiner—Kimberly L. Asher
Attorney, Agent, or Firm—Thorpe, North & Western

[57] ABSTRACT

A system for conveying information to an underwater diver wearing a mask. The information is conveyed via a field of view display system which places the information at the glance of the diver through the viewing window of the diving mask. Included are sensors for measuring the pressure in the dive tanks, for sensing the depth of the diver, and for sensing the ambient temperature of the surrounding environment. A microcomputer processes the sensed information and displays it to the diver as well as interpreting the information to provide advice such as safe assent rates which will allow the diver to avoid decompression sickness and the remaining safe dive time. The display placed within the field of view desirably includes an optical arrangement for placing an image of a visual array at a long focus distance, preferably at infinity, in relation to the eye of the diver and for magnifying the actual image of the visual array means such that the diver can readily observe the image of the visual array. The present invention keeps the diver informed of important information without the diver's attention being diverted from the surrounding environment and without requiring additional movement or effort from the diver.

29 Claims, 15 Drawing Sheets

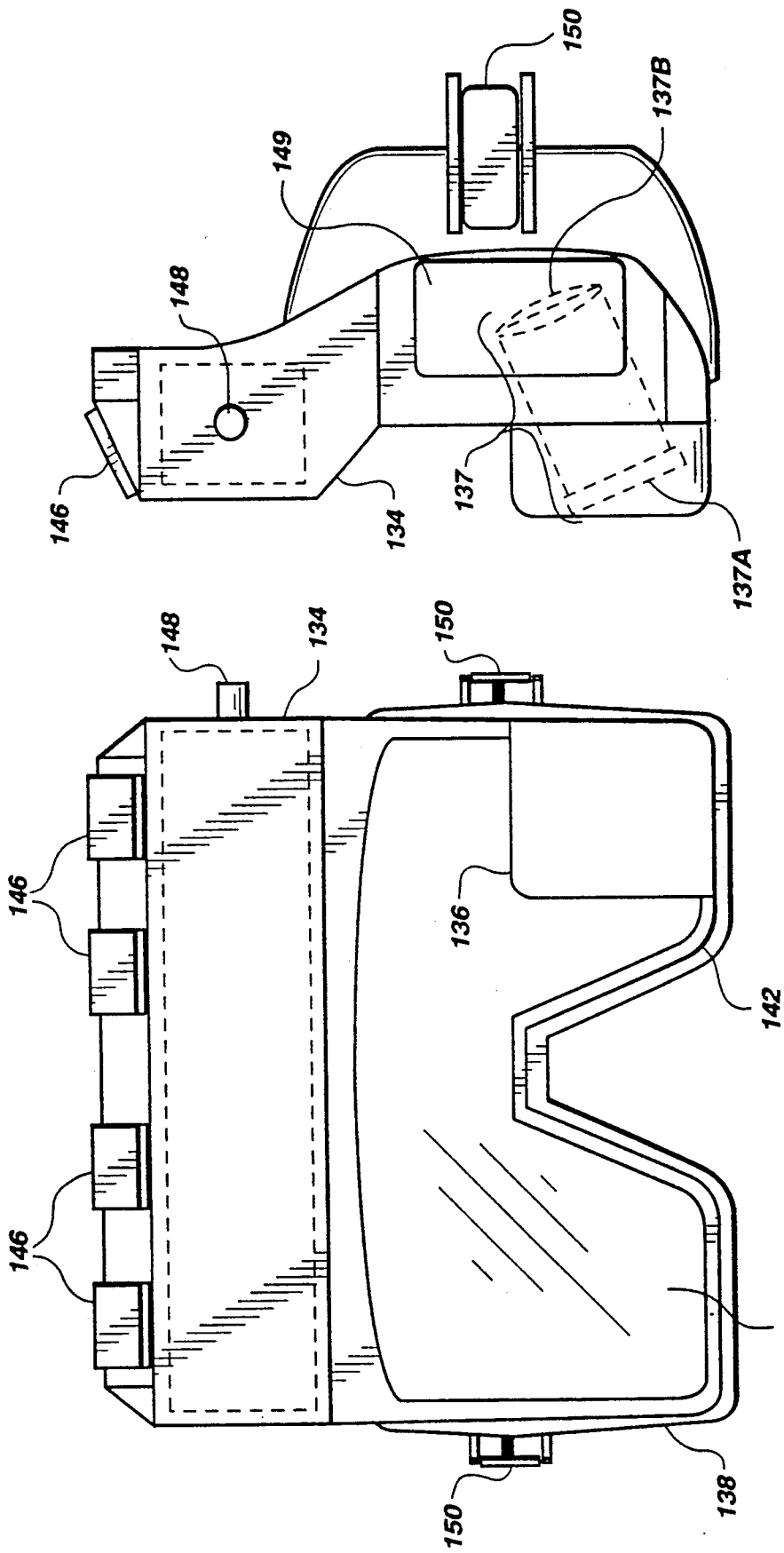

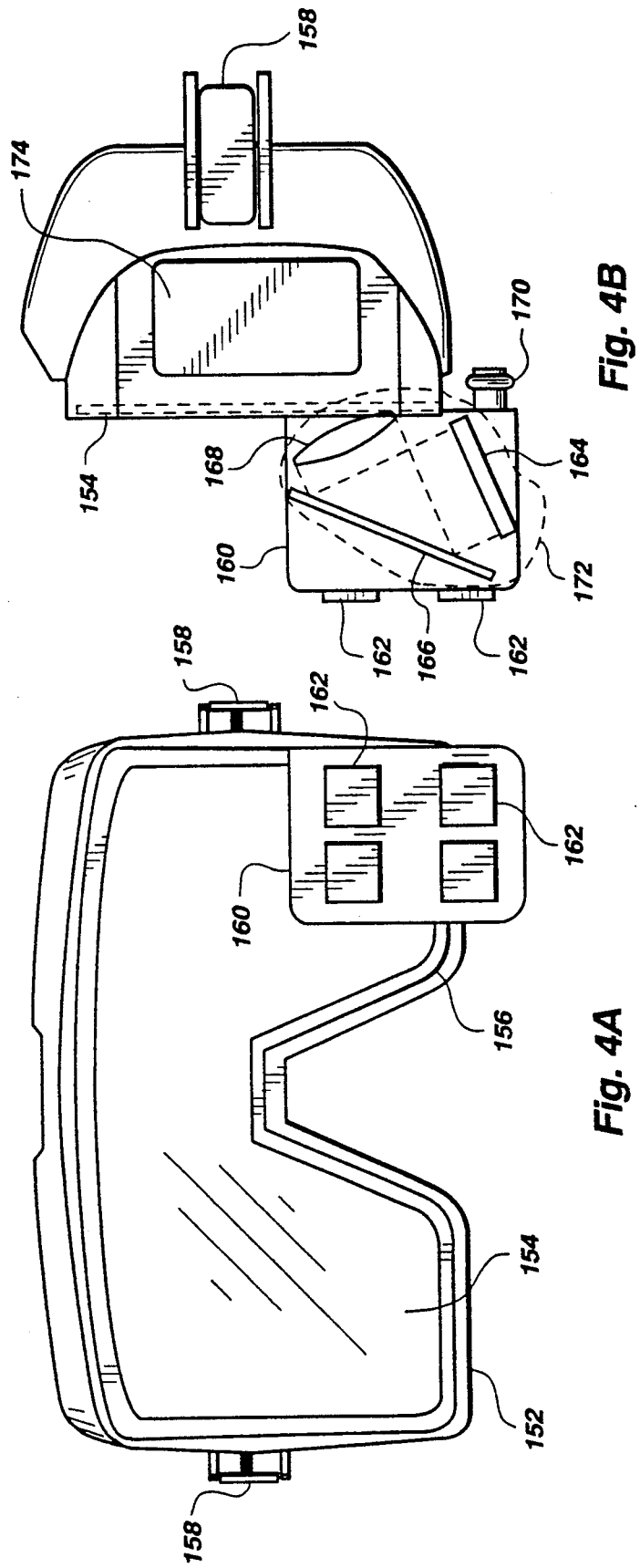

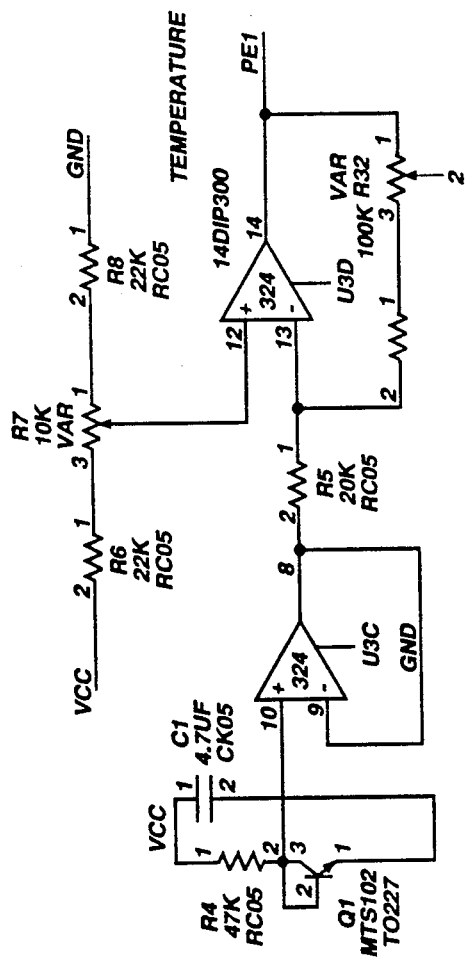
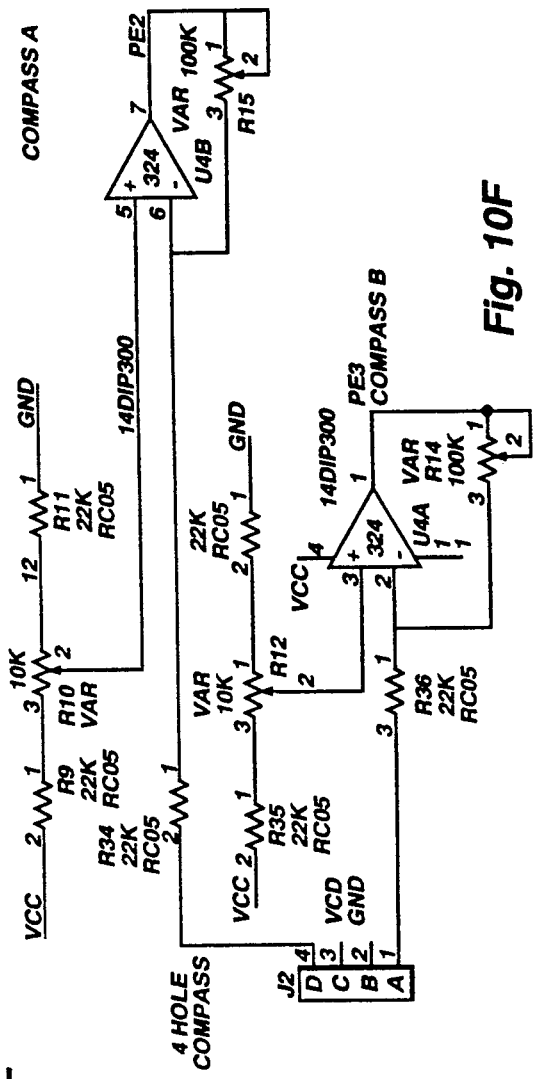
Fig. 10E
Fig. 10F

FIELD OF VIEW UNDERWATER DIVING COMPUTER MONITORING AND DISPLAY SYSTEM

BACKGROUND

1. Field of the Invention

This invention relates to apparatus used in connection with underwater diving equipment. More particularly, the present invention relates to equipment used to apprise an underwater diver of important information needed to efficiently use diving time and to maintain safe diving conditions.

2. The Background Art

The introduction of underwater diving using Self-Contained Underwater Breathing Apparatus (SCUBA) in the 1940's by Jacques-Yves Cousteau and Emil Gagnan opened up new possibilities in underwater exploration. Today, scuba diving is a very popular sport as well as an indispensable professional activity. It is estimated that more than 3,000,000 divers are currently "open water" certified and that another 600,000 new divers are certified worldwide each year. Thus, diving is expected to become more widespread both as a recreational activity and as a professional endeavor.

Regardless of the expansion of diving, it is considered by many to be an inherently dangerous activity. Thus, safe diving practice as well as the science and physiology of diving are taught as part of the open water certification process. Safety procedures and practices are continually being emphasized by manufacturers, educators, and participants in the industry.

In order to allow the recreational diver to participate in the sport both safely and enjoyably, it is imperative that the diver be apprised of environmental conditions during the dive as well as the status of the diving equipment. Such environmental conditions and equipment status include the elapsed time of the dive and the maximum depth of the dive and the time spent at the maximum depth. It is also important to keep an accurate log of each dive made in the recent past so that repetitive dives over a period of time can be safely performed.

While underwater diving has many hazards, one of the hazards which can be managed is decompression sickness (DCS), commonly known as the "bends." DCS comes about because inert gases (principally nitrogen, which is the major constituent of air compressed into the air tanks of most divers), are absorbed into the blood and tissues of a diver during a dive. The greater the depth of the dive (i.e., the greater the ambient pressure on the diver) and the length of the dive, the greater the amount of nitrogen which is absorbed into the diver's blood and tissues. If the diver rapidly returns to a shallower depth, or to the surface, the decrease in ambient pressure causes the nitrogen to be deabsorbed and harmful bubbles form in the tissue and blood.

The process of absorption and deabsorption of nitrogen into the blood and tissues is governed by Boyles Law and the fact that the partial pressures of inert gases (principally nitrogen), increases as the diver proceeds deeper into the dive. This causes a disequilibrium between the inert gases in the blood, fluids, and tissues of the diver's body and the air mixture being inhaled. This disequilibrium causes more of the inert gases to be absorbed by the body of the diver. Upon assent to the surface the ambient pressure is reduced and the disequilibrium is again created. This time however, excess gases are deabsorbed by the body fluids and tissues into the air mixture being exhaled. If the dissolved gases are released too quickly they form bubbles in the blood, fluids, joints, and other tissues of the diver's body which can cause problems ranging from minor discomfort to death.

DCS can be controlled by monitoring dive conditions, limiting dive depth and the length of the dive, and controlling the assent rate to the surface. Nevertheless, due to human nature and other realities of diving, divers occasionally encounter DCS because of miscalculations or misjudgments.

Potential problems with DCS exist in every dive and are dealt with by educating the diver about safe dive depths, dive times, and assent rates. Such variables can be very roughly manually calculated using dive tables, for example those provided by the U.S. Navy and other organizations, to determine the safe rate of assent from a maximum depth in conjunction with the time spent at that maximum depth. Importantly, both professional and recreational divers require accurate information about the parameters of their dives so that diving time and the depths can be maximized.

In order to give the diver the information needed to plan and control a safe dive, a diver is now often equipped with underwater stop watches, conventional magnetic compasses, analog scuba tank pressure gauges, and depth gauges, as well as occasionally a thermometer. Recently, carry-along dive computers, which monitor various environmental and equipment sensors and perform dive table type calculations, have been available to provide important information to a diver during the course of the dive.

Provided in FIG. 1 is a representation of a diver, generally indicated at 10, using one of several previously available carry-along dive computers. In the arrangement illustrated in FIG. 1, the dive computer console 18, which includes gauges or indicators 19, is connected to a scuba air tank 12 by way of a high pressure hose 20 which communicates the pressure within the scuba air tank 12 to the dive computer console 18. The diver 10 receives air from the tank 12 via a conventional mouth piece 14 connected to the tank by a low pressure hose (not represented).

In the arrangement represented in FIG. 1, the dive computer console 18 hangs down behind the diver 10, traditionally on the left side of the diver. In some instances, the dive computer console is held in the diver's hand or is attached to the diver's arm.

One readily recognized problem with the arrangement for a dive computer shown in FIG. 1 is that the diver must reach for, and grasp, the dive computer console 18 and bring it into his field of view each time the gauges or indicators 19 are to be checked. Because the diver 10 must make a conscious effort to reach for the dive computer console 18 and bring it into his field of view, it is less likely that the diver 10 will check the gauges or indicators 19 as often as is desirable due to environmental distractions or a task at hand. Also, because it is not easy to find and grasp the dive computer console 18, in a panic moment or critical situation the diver may be unable to quickly grasp it and/or bring it into his field of view.

Moreover, the arrangement using a dive computer console 18 attached to the tank 12 via a high pressure hose 20 poses the safety risk of the high pressure hose 20 or dive computer console 18 snagging or catching on underwater objects such as coral. Also, the dangers posed by rupturing the high pressure hose 20 are readily evident.

Additionally, in murky or turbid water it may be impossible to observe the gauges or indicators 19 unless they are placed against the viewing window of the diving mask 16. This requires the diver 10 to divert his attention from the task at hand on a regular basis or from a dive buddy (companion) which the diver 10 should be continuously observing in order to ensure the dive buddy's safety. Moreover, when divers are exploring coral reefs constant attention should be paid to avoiding contact with the reef; both unintentional and intentional contact by divers causes the destruction of many coral reefs in the world.

Because of these and other drawbacks and problems encountered in the present state of the art, it would be a great advance in the art to provide a dive computer which overcomes these disadvantages by providing safer and more efficient underwater diving.

BRIEF SUMMARY AND OBJECTS OF THE INVENTION

In view of the above described state of the art, the present invention seeks to realize the following objects and advantages.

It is a primary object of the present invention to provide a dive computer system which conveys important information to a diver in a more safe and efficient manner than previously available devices.

It is also a significant object of the present invention to provide a dive computer system which efficiently conveys important information to the diver without diverting the diver's attention away from the surrounding environment.

It is a further object of the present invention to provide a dive computer which does not present any hazardous high pressure hoses or consoles which can snag on underwater objects and formations or become entangled with the diver's other equipment.

It is another object of the present invention to provide a dive computer which does not present any additional dangers to a diver such as the rupturing of a high pressure hose or severing of an electrical cable.

It is still another object of the present invention to provide a dive computer system which includes a compass function and which provides hands-free operation and which operates reliably when the diver is positioned in any of a number of orientations.

It is also an object of the present invention to provide a dive computer which provides long operating time without changing or recharging batteries.

It is a further object of the present invention to provide a dive computer system which presents continuously updated information within the diver's field of view and which can accommodate a variety of eyesight parameters, facial structures, and eye shapes and sizes.

It is another object of the present invention to provide a field of view display which can be used in association with a variety of different types of masks so that information can be conveyed to the user without requiring the user to make any head movements or hand movements.

Another object of the present invention is to provide a field of view display which can be integrally formed in a mask or retrofit onto an existing mask.

These and other objects and advantages of the invention will become more fully apparent from the description and claims which follow, or may be learned by the practice of the invention.

The present invention provides a great advance in the art pertaining to devices and systems used to improve the efficiency and safety of underwater diving as well as providing an improved system for conveying information to users wearing a mask over their eyes. The present invention is primarily intended to be used as a system for conveying information to an underwater diver wearing a mask but can also be used in other applications. The present invention keeps an underwater diver informed of important information during a dive without requiring the diver to divert his attention from the surrounding environment. Underwater divers generally wear a mask which includes a viewing window through which the diver is provided a field of view of the surrounding environment.

The preferred embodiments of the present invention include a means for sensing the pressure in at least one tank, holding a breathable gas supplied to the diver, and for generating a tank pressure signal. Also included is a means for sensing the depth under the surface of the water the diver is submerged. The means for sensing the depth also generates a depth signal. Additionally, a means for processing the tank pressure signal and the depth signal is included. The means for processing generates a display signal which contains information which is to be conveyed to the diver. The means for processing preferably comprises a microcomputer and its associated signal processing circuitry.

A means for displaying the information conveyed by the display signal within the diver's field of view is also provided. The means for displaying is arranged such that the diver is able to visually perceive the information with only a movement of an eye within the field of view. Desirably, a means for holding the means for displaying in a position on the mask is provided. Thus, the diver or other user is apprised of important information without moving his head or hands.

The means for displaying can desirably include a visual array means for providing a visually perceptible representation of the information conveyed by the display signal. The means for displaying preferably also includes a means for placing an image of the visual array means at a focus distance in the range from about six feet to about infinity, and most preferably in the range from about three feet to about infinity, in relation to the eye of the diver, as well as, a means for magnifying the actual image of the visual array means such that the diver can readily observe the image of the visual array means. The structures of the means for displaying, or the field of view system, can be carried out using lenses, mirrors, and/or other optical components. Significantly, the embodiments of the present invention can be configured integrally with a mask or other components or can be added to existing components, e.g., masks and tanks, as a retrofit.

Also included in some preferred embodiments of the present invention is a means for detecting changes in the relative orientation of the earth's magnetic field and generating a compass signal with respect to its orientation in the earth's magnetic field. The compass signal is also processed by the means for processing and presented to the diver as an image within the diver's field of view.

Preferably, the means for detecting changes in the relative orientation in the earth's magnetic field comprises a fluxgate compass device. Other devices, both those now available and which become available in the future, can also be used within the scope of the present invention as a compass sensor. In order to allow the compass sensor to properly operate in a diving environment, a means for maintaining the compass device in substantially the same orientation in one (horizontal) plane is also provided. The means for maintaining the compass device in substantially the same orientation desirably can include suspending the compass sensor in a liquid to dampen transient movements.

The display means can desirably include a light emitting diode array, a liquid crystal display (preferably with supplemental illumination), or some other solid state array device. In most preferred embodiments, many of the sensors will be positioned remotely from the means for displaying and a fiber optic link, such as a fiber optic cable which is inherently safer and more reliable in an underwater environment than electrical cables, is provided to convey signals between the components.

The preferred embodiments of the present invention also can include means for sensing the ambient temperature of the surrounding environment which generates a temperature signal that can be visually represented on the means for displaying. A means for conveying audio messages to the diver can also be provided. The means for displaying can also include: means for displaying the temperature of the water surrounding the diver; means for displaying the minimum temperature of the water encountered on the most recent dive; means for displaying the current depth under the surface of the water of the diver; means for displaying the maximum depth under the surface of the water encountered on the most recent dive; the current pressure found within the tank; and, the elapsed time since the beginning of the most recent dive.

As will be appreciated, the present invention includes combinations of features and structures heretofore unknown and not suggested in the available pertinent art which solves problems which have been unrecognized and/or unsolved for a long time.

BRIEF DESCRIPTION OF THE DRAWINGS

In order to better appreciate how the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIGS. 3A and 3B are front and side views, respectively, of a preferred embodiment of the present invention in which many of components, including an optical display, have been integrated into a dive mask.

FIGS. 4A and 4B are front and side views, respectively, of another embodiment of the present invention wherein the optical display is fitted onto the front of an existing dive mask so that the existing dive mask is retrofitted with an embodiment of the present invention.

FIGS. 10a-10g are detailed schematic diagrams showing one preferred arrangement for the electrical components of the present invention.

DETAILED DESCRIPTION OF THE PREFERRED EMBODIMENTS

Reference will now be made to the drawings wherein like structures will be provided with like reference designations.

As explained earlier, previously available dive computers inherently have several drawbacks and disadvantages. A principle drawback present in the earlier dive computers is that the diver must be distracted from the surrounding environment and his dive companion in order to make use of the device. The described embodiments of the present invention overcome this heretofore unrecognized problem and/or unsolved problem by providing structures which present needed information to the diver within the diver's field of view, i.e., within a quick eye glance away.

Moreover, the present invention provides additional features which greatly add to the convenience and safety of a diver which will be explained in detail hereinafter. While the preferred embodiments of the present invention are described herein for use in an underwater diving environment, the present invention has application in many different settings. For example, the present invention can advantageously be used by persons wearing a mask, helmet, or other mask-like structure, such as those used by fire fighters, rescue workers, motorcyclists, or others, who need to be continually apprised of the value of one or more measurable parameters concerning them, i.e., a physiological variable, or their environment, i.e., the temperature.

Figure 2A:
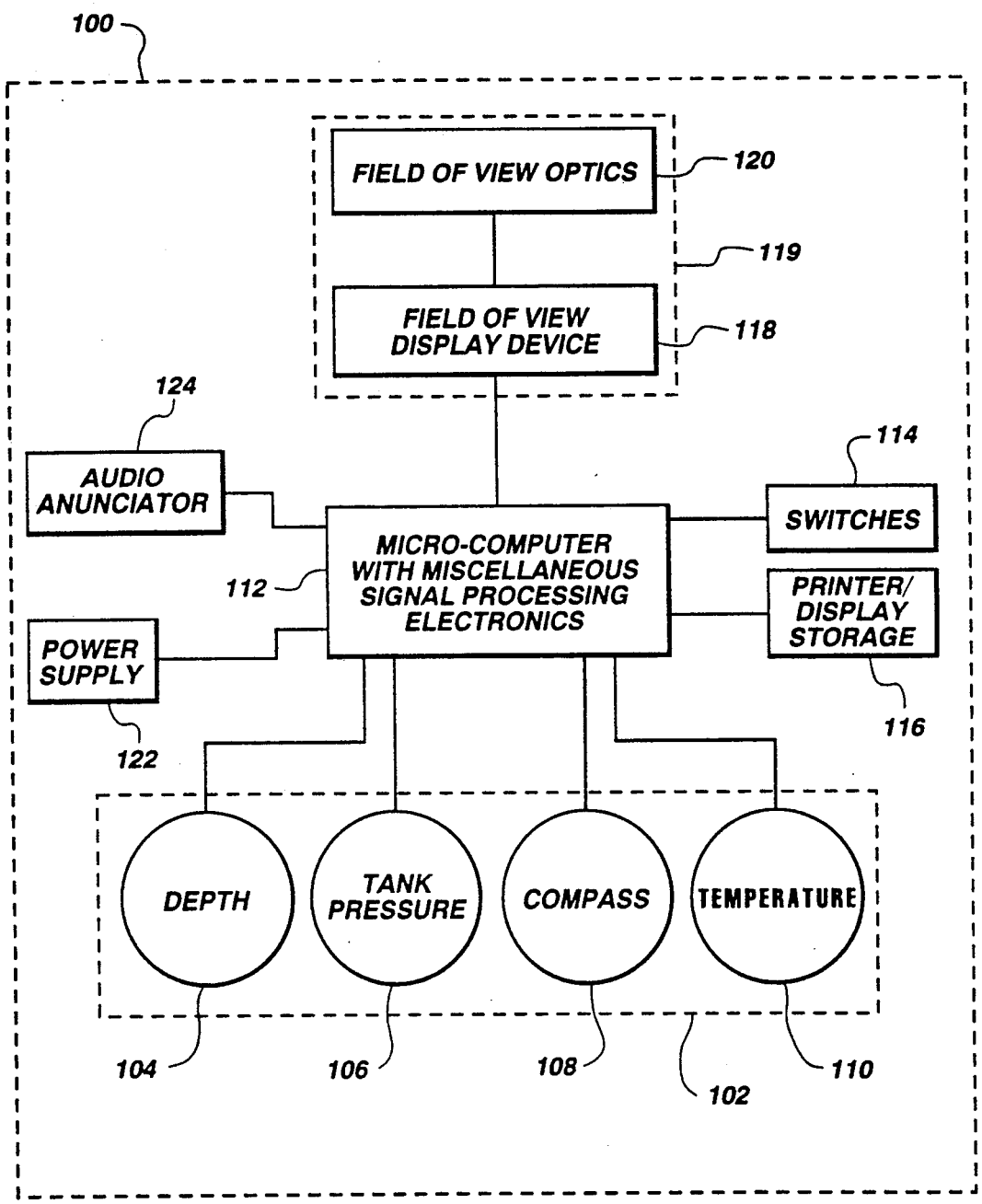
FIG. 2A is a block diagram of one presently preferred embodiment of the present invention.

Referring first to FIG. 2A, within dashed box 100 is a block diagram representing the principal components included in the presently preferred embodiment of the present invention. Represented in FIG. 2A is a sensor block 102 which includes a depth sensor 104, a tank pressure sensor 106, a compass sensor 108, and a temperature sensor 110. Each of these sensors and their relationship with other apparatus components will be explained in detail later in this disclosure. All of the described sensors are exemplary of a means for sensing the value of at least one measured parameter.

It will be appreciated that the depth sensor 104 and the temperature sensor 110 provide needed information for avoiding DCS. The depth sensor is preferably one available from Fujikura, Model FPB-04A. The temperature sensor 110, which is preferably one of the silicon temperature sensors available from Motorola Semiconductors of Phoenix, Ariz. and which will be more fully described in connection with FIGS. 1A-G, is the presently preferred example of a means for sensing the ambient temperature of the surrounding environment and for generating a temperature signal. Many structures, including those now available and those which will become available in the future, can be used within the scope of the means for sensing the ambient temperature of the surrounding environment.

The compass sensor 108 is used to provide helpful directional information to the diver who may be working in murky water where it is easy to become disoriented. The compass sensor, which is preferably the device described in connection with FIGS. 9A-9C, and its associated components function as the presently preferred example of a means for detecting changes in the relative orientation of the earth's magnetic field and generating a compass signal with respect to its relative orientation in the earth's magnetic field. One skilled in the art will appreciate that many structures, other than those explicitly disclosed herein, can serve as the means for detecting changes in the relative north-south orientation of the diver earth's magnetic field. As used herein, the term "compass heading" or compass sensor is intended to encompass any directional system or apparatus which functions to provide the user information on this terrestrial orientation.

The tank pressure sensor 106 provides information needed to determine the supply of air which remains for the diver to use; an essential fact if a diver is to make optimum use of his diving time. While it is preferred that all of the mentioned sensors be included in embodiments of the present invention, it is within the scope of the present invention to include less than all of the mentioned sensors and still obtain many of the advantages which are obtained by the present invention.

The tank pressure sensor described herein is the preferred example of a means for sensing the pressure in at least one tank holding a breathable gas supplied to the diver and for generating a tank pressure signal. It will be appreciated that many other structures performing similar or equivalent functions can also serve as a means for sensing the pressure.

The depth sensors described herein are the presently preferred examples of a means for sensing the depth under the surface of the water the diver is submerged and for generating a depth signal. Those skilled in the art will readily be able to substitute other components performing similar or equivalent functions using the teachings contained herein to carry out the means for sensing the depth.

Figure 1:
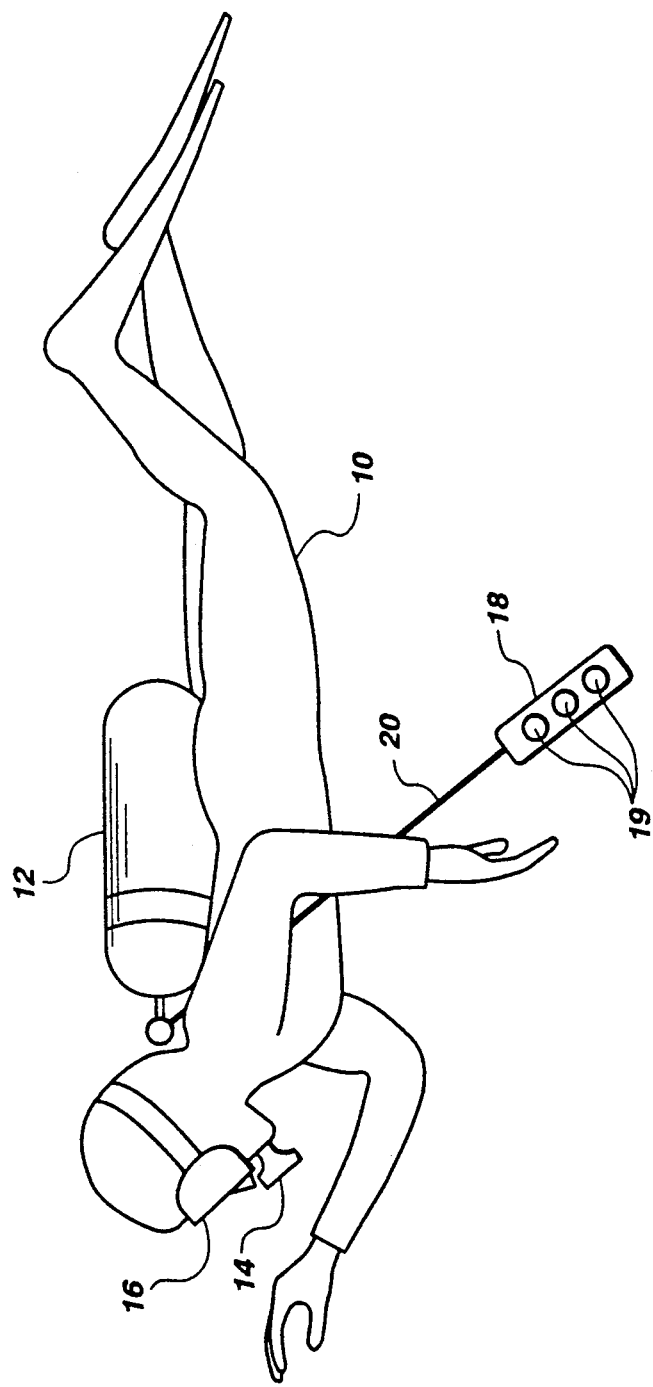
FIG. 1 is a side view of a diver using a prior art dive computer.

Also represented in FIG. 1 is a microcomputer 112. Associated with the microcomputer 112 is a variety of signal processing electrical components which will be further identified later. Significantly, the microcomputer is programmed to receive the information received from the depth sensor 104, the tank pressure sensor 106, the compass sensor 108, and the temperature sensor 110 to provide valuable information to the diver concerning the time which the diver can remain underwater, the direction the diver is oriented, the depth of the diver, as well as other information as will be explained and as will be recognized by those skilled in the art.

The microcomputer and its associated signal processing circuitry, further described herein in connection with FIGS. 10A-G, is the presently preferred example of a means for processing the various signals from the sensors and for generating a display signal. It is to be understood that many other arrangements, whether now known or which become available in the future, which perform similar or equivalent functions can also operate within the scope of the means for processing of the present invention. Those skilled in the art will be able to readily devise such alternative arrangements using the teachings contained herein.

A power supply 122 is also represented in FIG. 2A which is preferably battery operated so that the embodiment can operate independently of any other power source. It is also desirable to include power conservation schemes, such as switching components on and off and utilizing low power consumption products, in order to maximize the useful life of the batteries or other power source which is included in the power supply 122.

Also represented in FIG. 2A are switches 114 which are used to control the operation of the apparatus 100. Such switches 114 can include single pole, single throw on-off switches, multiple position switches, a numeric or alpha-numeric keyboard, or other input devices. Also indicated in FIG. 2A is an audio annunciator 124 which optionally can be included to convey audio messages to the diver. In some cases, it will be desirable to be able to download data or programming into the microcomputer 112 and such input devices can also be chosen to facilitate such downloading, either manual or automated, as will be understood by those skilled in the pertinent arts.

Also represented in FIG. 2A are a printer/display device 116 which can include automated data reception and storage devices used to obtain data which is uploaded from the microcomputer 112 via a communications port using techniques which are known in the art. The printer/display device 116, for example a dot matrix or thermal printer or a video display, is desirably used to obtain information, and desirably compile a dive log, for review and/or analysis from the microcomputer 112 after a diver has returned to a boat or to land after one or more dives have been completed.

Still referring to FIG. 2A, a display device 118 is included in the embodiments of the present invention to convey information to the diver. The display device 118 is preferably a miniaturized, light emitting diode array or some other low power consumption device such as a liquid crystal display (LCD) but other types of displays may be used within the scope of the present invention.

In accordance with another aspect of the present invention, a field of view optics 120 and field of view display device 118 comprise a field of view display system as indicated by dashed box 119. The field of view optical components 120 function to convey the information presented by the field of view display device 118 to the diver's, or other user's, field of view. Thus, a diver who is wearing a diving mask 16 (FIG. 1) generally has a wide field of view of the surrounding environment. The field of view display system 119 allows the user to visually perceive the information provided by the field of view display device 118 requiring, at most, a glance from the user to obtain the information. Preferably, no hand or head movement is necessary for the user to view the information.

The field of view optics 120 provided in the described embodiment magnifies the image of the field of view display device 118 and also make it so that the user is not required to significantly change the focus of his eye as he changes his view from the surrounding environment to the information presented by the field of view display device 118, even though the field of view display system 119 is preferably positioned in the range from about 0.5 inches to about 8 inches, and most preferably in the range from about 0.5 inches to about 3 inches, from the surface of the eye. It will be understood that the field of view display device 118 and the field of view optics 120 must work together in order to achieve optimum performance of the embodiments of the present invention. The preferred components for carrying out these functions will be discussed shortly.

Figure 2B:
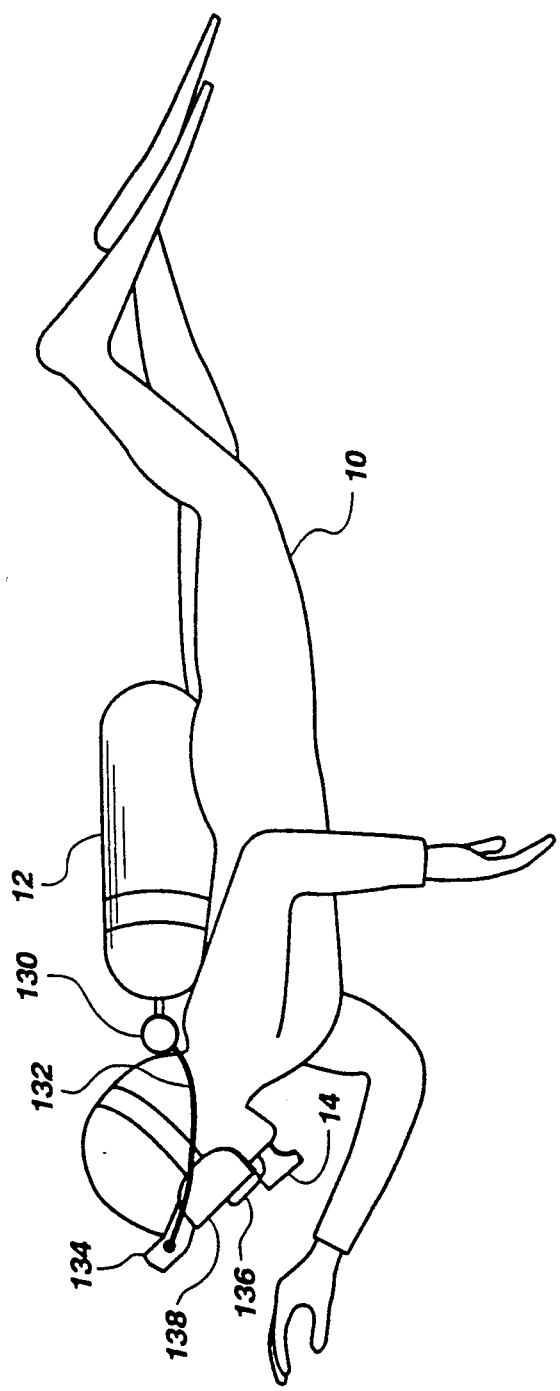
FIG. 2B is a side view of a diver using a presently preferred embodiment of the present invention.

Referring next to FIG. 2B, a side view of a diver using a presently preferred embodiment of the present invention is provided. The diver 10 is equipped with conventional underwater diving equipment including the scuba air tank 12. In addition to the conventional equipment connected to the scuba air tank 12, i.e., a regulator, a sensor housing 130 has been added to, or preferably incorporated into, the regulator. The sensor housing 130 contains the tank pressure sensor 106, and can accommodate other sensors such as the depth sensor 104, the compass sensor 108, and the temperature sensor 110 (see FIG. 2A). Another preferred arrangement is to locate such sensors in a housing mounted on the mask 16.

It will be appreciated that the various sensors included in the preferred embodiments of the present invention may be housed in locations different than those described herein. For example, the signal processing circuitry of the sensors, or in some cases the transducer portion of the sensors, can be located in a microcomputer housing 134. The microcomputer housing 134 is fashioned integrally with diving mask 138 which is strapped to the diver's 10 head. The weight of the components located within the microcomputer housing 134 should be light enough to not hinder the movement of the diver's head. It will be understood that the sensor housing 130 and the microcomputer housing 134 must be fabricated so as to be water tight and with appropriate apertures for the sensor transducers and cables. Any batteries (not represented) needed to operate the components can be located in either housing, or both housings, as desired.

It is preferred that the necessary connection between the sensor housing 130 and the microcomputer housing 134 be made using a fiber optic cable 132. Those skilled in the art will appreciate that a properly selected fiber optic cable is a safe and secure component. The fiber optic cable, and its associated components, are a preferred example of the communications means for establishing a communicating path of the present invention. It will be appreciated that other components, including wired and wireless communication components, can function as the communication means of the present invention.

The placement of the tank pressure sensor 106 and the other sensors adjacent to the tank 12, and then communicating any signals to and from the sensors via the fiber optic cable 132, is inherently safer than including a high pressure hose (20 in FIG. 1) between the tank 12 and a sensor found in previously available apparatus.

In the embodiment represented in FIG. 2B, the field of view display system (119 in FIG. 2A) is integral with the diving mask 152 and located in a display housing 136. While it is preferred that the electrical and optical components of the field of view display system be formed integrally with the diving mask 138, it is within the scope of the present invention to fabricate the necessary components as a retrofit to existing diving masks or separate from the diving mask as will be explained shortly.

The display housing 136, and any other structures required to hold the field of view display system in place as known by those skilled in the pertinent arts, is the presently preferred example of a means for holding the field of view display system in position on the mask. It is to be understood that many other structures now known, or which will become available in the future, can also perform the function of the claimed means for holding.

Reference will next be made to FIGS. 3A and 3B which are front and side views, respectively, of the diving mask 138 included in one presently preferred embodiment of the present invention. The diving mask 138 includes a lens 140 which provides a field of view to the diver. A diving mask bezel 142 holds the lens in place and also is configured to hold the display housing 136 in place. Also represented in FIGS. 3A and 3B is a strap 150 which functions to keep the diving mask 138 in place on the head of the diver. A side lens 149 is also included in the particular diving mask represented in FIG. 3B.

Formed on the top side of the diving mask 138 is the microcomputer housing 134. Formed on the upper side of the microcomputer housing 134 are a plurality of control switches 146. The illustrated position of the control switches 146 is preferred since it provides a convenient and easy-to-reach location for the diver. The control switches 146 are preferably of a size to ensure that they can be accurately operated with a gloved hand. The microcomputer housing 134 must be water tight and includes a receptacle 148 for receiving the fiber optic cable 132. It is desirable that the receptacle allow the fiber optic cable 132 to be disconnected when the embodiment of the invention is not in use but hold the fiber optic cable 132 securely when in use.

As shown best in the phantom image provided in the side view of FIG. 3B, an electrical display device 137A, which is the presently preferred example of a visual array means of the present invention, and an optical lens 137B are together generally represented at 137. As can be seen in FIGS. 3A and 3B, the electrical display device and optical lens 137 are positioned within the diver's field of view; thus, the diver is not required to divert his attention from the surrounding environment when viewing the display. The position of the electrical display device and optical device 137 can be varied so that the user's view of the surrounding environment is substantially unhindered.

The field of view electrical display device 137A, the field of view optics (lens) 137B, and any required associated structures are the presently preferred example of a means for displaying the information conveyed by a display signal generated by the microcomputer and the other signal processing circuitry. Importantly, those skilled in the art, using the teachings contained herein, will be able to fabricate many other structures which fall within the scope of the herein claimed means for displaying.

Still further, the present invention can make use of other techniques, such as projection techniques, to display the needed information to the user. Moreover, other types of display techniques, both those now known and which will become available in the future, such as semi-transparent display devices and the use of fiber optics to convey an image to the eye, can also be used within the scope of the present invention.

FIGS. 4A and 4B represent another presently preferred embodiment of the present invention. The embodiment of FIGS. 4A and 4B illustrates how the present invention can be adapted for use on an existing diving mask 152. The embodiment represented in FIGS. 4A and 4B has best application in retrofitting diving masks, which are already owned by a diver, with the benefits of the present invention. Still, the concepts represented in the embodiment of FIGS. 4A and 4B can be utilized in other specific embodiments of the present invention.

The diving mask 152 includes a bezel 156 which holds a mask lens 154 and a side lens 174 in place. As is customary in the art, a strap 158 holds the diving mask 152 in position on the diver's head as illustrated in FIG. 1. In order to provide a field of view display in accordance with one aspect of the present invention, a display housing 160 is attached to the front of the diving mask 152 and preferably against the mask lens 154.

On the exterior of the display housing 160 are a plurality of control switches 162 which preferably function similarly to control switches 146 (FIG. 3A). The display housing 160 can be attached to the diving mask 152 using any number of techniques known in the art according to the configuration of the diving mask 152.

Located within the display housing 160 are an electrical display device 164, which preferably is a light emitting diode display, a mirror 166, and a lens 168, all generally designated as a field of view display system at 172 in FIGS. 4A and 4B. It will be appreciated that the field of view display system 172 shown in FIGS. 4A and 4B is merely a diagrammatic representation of the electrical and optical components which will be explained later in greater detail. As in the before described embodiments, the field of view display system 172 conveys important information to the user within his field of view.

While not explicitly represented in FIGS. 4A and 4B, it will be understood that various electrical and mechanical support components will also be included in the display housing 160. A fiber optic connector 170 is also included to receive a fiber optic cable which conveys data between the sensors positioned in a sensor unit which will be described next in connection with FIG. 5. While a fiber optic cable is preferred, it is within the scope of the present invention to also utilize an electrical cable. Those skilled in the art can determine which components should be housed in the display housing 160 and which in the sensor unit.

It will be appreciated that with the use of either of the embodiments represented in FIGS. 3A-3B or 4A-4B, the user is provided with the same important advantages inherent with the present invention.

Figure 5:
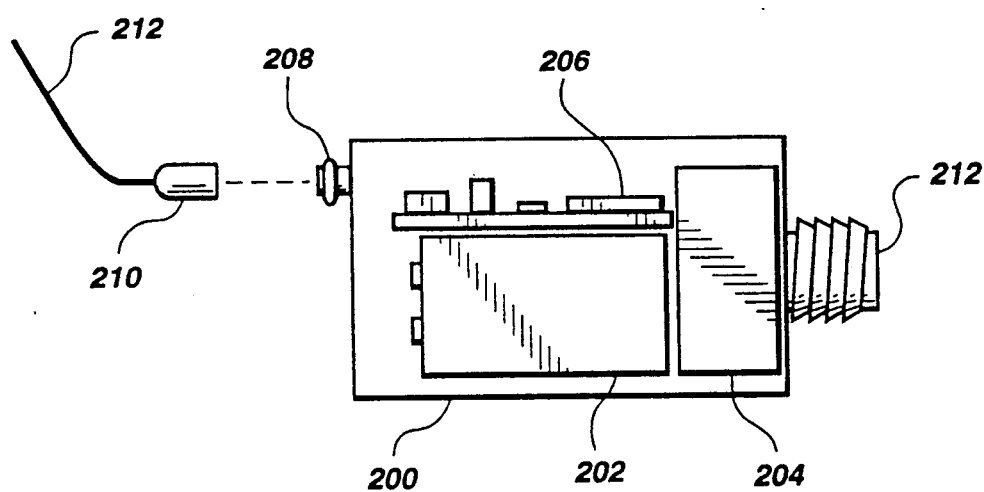
FIG. 5 is a plan view of the components mounted on a scuba air tank when the optical display illustrated in FIGS. 4A and 4B is used.

FIG. 5 is a diagrammatic representation of a sensor unit 200 which is preferably mounted on the air tank (12 in FIG. 2B) used by the diver. The sensor unit 200 preferably includes a threaded gas connector 212 which is joined directly to an appropriate fixture on the tank, or by a short hose (not represented), by which the pressure within the tank is communicated to a pressure transducer 204 which generates a signal representing the pressure within the tank. By mounting the sensor unit 200 on the air tank 12 (FIG. 2B), the need for a long high pressure hose (20 in FIG. 1) which is subject to rupture and entanglement, and the hazards presented thereby, is eliminated. The pressure transducer 204 can preferably be one available from Nova Sensor of Fremont, Calif. referred as the "PI" series of sensors which are solid state, temperature compensated, all media precision sensors.

The sensor unit 200 also preferably includes a battery 202 which supplies electrical power for the components included therein. Other sensors, a microcomputer, and other electrical signal processing components are represented in FIG. 5 at 206. The microcomputer which is preferred for use in the described embodiments is one available from Motorola of Phoenix, Ariz. referred to as a MC68HC11E2 microcontroller unit. Complete information concerning the preferred microcontroller is available from the manufacturer from publications such as the MC68HC11 Reference Manual which is not incorporated herein by reference.

A fiber optic connector 208 is mounted on the sensor unit 200 and receives a fiber optic connector 210 provided at the end of a fiber optic cable 212. Signals from the sensor unit 200 are conveyed to the components located on the diving mask (FIGS. 3A-3 and 4A-4B) via the fiber optic cable 212. It will be appreciated that the use of a fiber optic cable 212 is inherently safer and more reliable than the use of an electrical cable and does not require water tight electrical connectors but can use fiber optic connectors (208 and 210) which are much less affected by moisture than are electrical connectors. Other structures, such as electrical cables or wireless radio frequency links, can also be used to convey the signals from the sensor unit 200. The housing for the sensor unit 200 is preferably water tight and is provided with appropriate shock absorption structures.

Figure 6A:
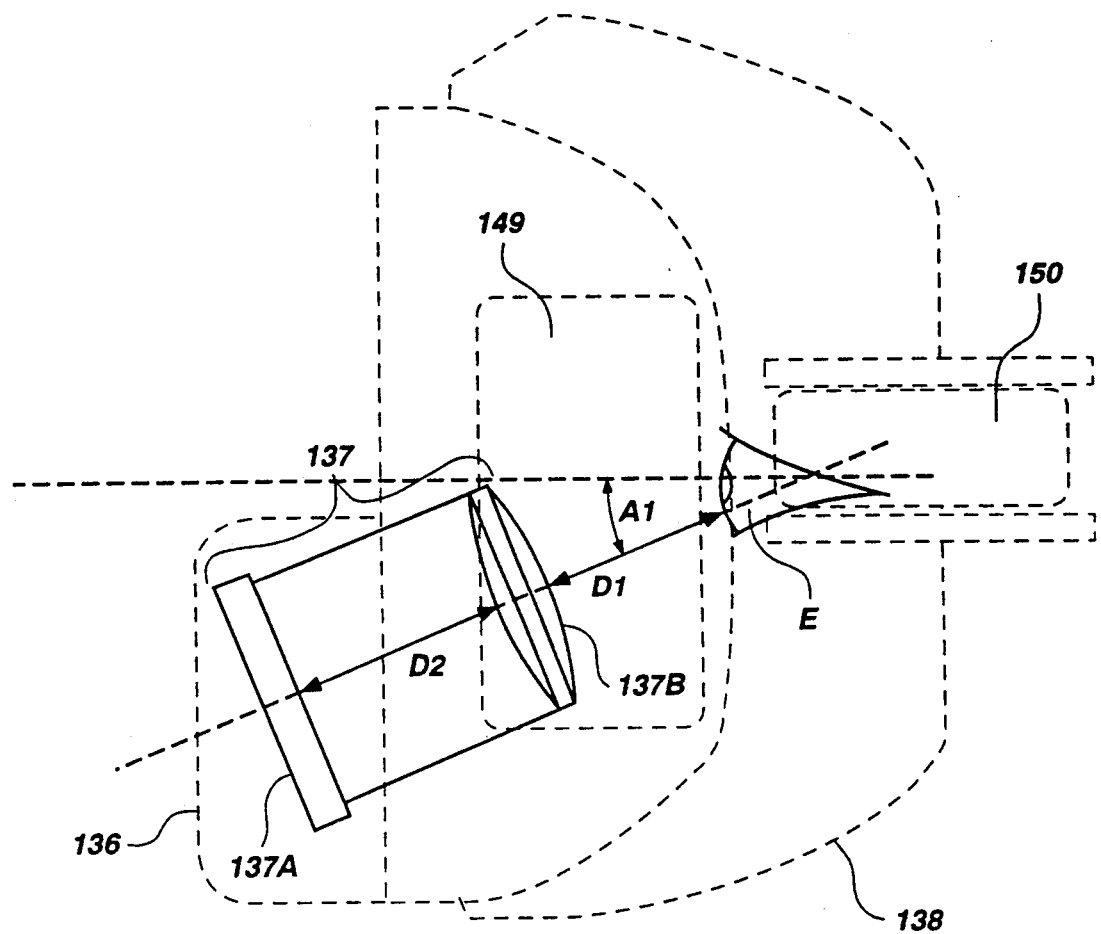
FIGS. 6A and 6B are side and top views respectively of the optical display included in the embodiment illustrated in FIGS. 3A and 3B.
Figure 6B:
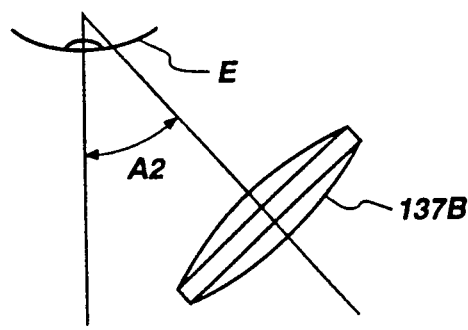

Referring next to FIGS. 6A and 6B, a more detailed diagrammatic representation of the field of view display system illustrated in FIGS. 3A and 3B is provided. The representation of FIG. 6 depicts the electrical display device 137A and, an optical lens 137B as one preferred arrangement for the field of view display system which is integral with the diving mask 138. In order to obtain an effective field of view system, the components thereof must be properly chosen and placed in relation to each other.

As will be appreciated by those skilled in the pertinent arts, various parameters of the field of view display system must be properly chosen. For example, as indicated at D: in FIG. 6A, the distance between the optical lens 137B (which may be a compound or multiple lens) and the electrical display device 137A and the Distance $D_1$ between the optical lens 137A and the user's eye E must be properly selected. Also, the focal length of the lens 137B should be properly selected so that the image viewed by the user's eye E can have the desired apparent focal length as well as the desired magnification of the display device 137A.

In many cases it may be advantageous to have the apparent location of the display 137A positioned at optical infinity relative to the position of the eye E. Thus, with the image of the electrical display device 137A located at infinity, the user only needs to shift his eye focus very little, if at all, when changing his attention from the surrounding environment and to the field of view display system. The location of the image of the electrical display device 137A can be varied from infinity in order to accommodate situations where the user is undertaking close work tasks which are within several inches or feet of the eye E.

The location of the image of the electrical display device 137A can be positioned at infinity by making the distance from the eye E to the optical lens 137B ($D_1$) equal to the focal length of the optical lens 137B and also making the distance from the electrical display device 137A to the optical lens 137B ($D_2$): equal to the distance from the eye E to the optical lens 137B ($D_1$).

The magnification of the image of the electrical display device 137A is controlled by the ratio of the distance between the eye E and the optical lens 137B ($D_1$) to the distance between the optical lens 137B and the electrical display device 137A ($D_2$). In order to keep the display housing 136 as small as possible and to present as much useful information as possible to the user, the display device 137A is also relatively small resulting in the characters presented on the display device being relatively small. Thus, it will generally be beneficial to magnify the image of the electrical display device 137A in the range from about 10 percent to about 250 percent.

The magnification M of the image of the electrical display device 137A represented in FIG. 6A is given by equation (1).

$$M = \frac{D_1}{D_2} \quad (1)$$

In the preferred embodiment represented in FIG. 6A, the distance ($D_2$) from the optical lens 137B to the electrical display device 137A is set at the focal length of the optical lens 137B, and the distance (D); from the optical lens 137B to the eye E is adjusted to the desired apparent focus distance and magnification of the image of the display device 137A.

Equation (2) is useful in making the necessary calculations and adjustments of the field of view display system in the embodiments of the present invention.

$$\frac{1}{FL} = \frac{1}{D_1} + \frac{1}{D_2} \quad (2)$$

where FL equals the optical lens focal length and $D_1$ and $D_2$ are as previously defined. If $D_2$ equals FL then $D_1$ is infinity and the image appears to the viewer as if it originated at infinity.

As mentioned previously, this arrangement accomplishes one of the objects of the present invention; allowing the user to read the image of the display without the need to refocus his eyes and/or allows both the surrounding environment and the image of the display to be viewed in focus simultaneously. Since the image of the electrical display device can be positioned so that it is always at least within the user's peripheral vision, the display device can be used to alert the user when a hazardous condition is detected, e.g., by flashing the display, even when the user's attention is directed to the surrounding environment. This is a great improvement over previously available apparatus where the user must make a conscious effort to view any display which was providing important information. Moreover, in order to increase the safety of the user, aural signals can also be used to warn of a condition requiring the user's attention.

Two angles, $A_1$ (FIG. 6A) and $A_2$ (FIG. 6B), should be considered when fabricating the illustrated embodiments of the present invention. Angle $A_1$ is the vertical angle which the eye E moves through when changing from a position looking directly ahead to a position looking directly into the optical lens 137B. Angle $A_2$ is the horizontal angle which the eye E moves through when changing from a position looking straight ahead to a position looking directly into the optical lens 137B.

By varying Angle $A_1$ and Angle $A_2$, the location of the field of view display system can conceivably be located anywhere in front of the eye. The preferred embodiments of the invention utilize the physiology of the eye socket (not represented) and the structural features of the user's face which allow the eye E to more easily look down and to the outside rather than looking up and to the inside. By placing the display system of the embodiments below and to the outside of the eye E, it is still possible to obtain a substantially unobstructed view through the mask lens while the image of the electrical display device remains in the field of view.

With the arrangement illustrated in FIGS. 6A and 6B, the central portion of the user's field of view has not been diminished by the placement of the field of view display system. The field of view display system can be preferably positioned on the right side of the mask, on the left side of the mask, or a field of view display system can be positioned on both the left and the right sides, one for each eye. When the present invention is being used to convey information to an underwater scuba diver, it is preferred to place the display system on the left side because it is customary to connect the scuba second stage regulator mouthpiece to the air tank via a high pressure hose on the divers right side.

It should be understood that it is possible to mount the display system anywhere in or on the mask or in front of the mask. The illustrated embodiments merely depict the preferred location with regard to the average physiology of the eye, eye socket, and facial features as well as minimizing restriction of the view directly out the mask when the diver is not observing the field of view display. It is also within the scope of the present invention to provide structures to adjust the position and the optical characteristics of the display system so that the image is easily viewed by different users each having a variety of, for example, facial features, sizes, shapes, and different eyeglass prescriptions.

Figure 7:
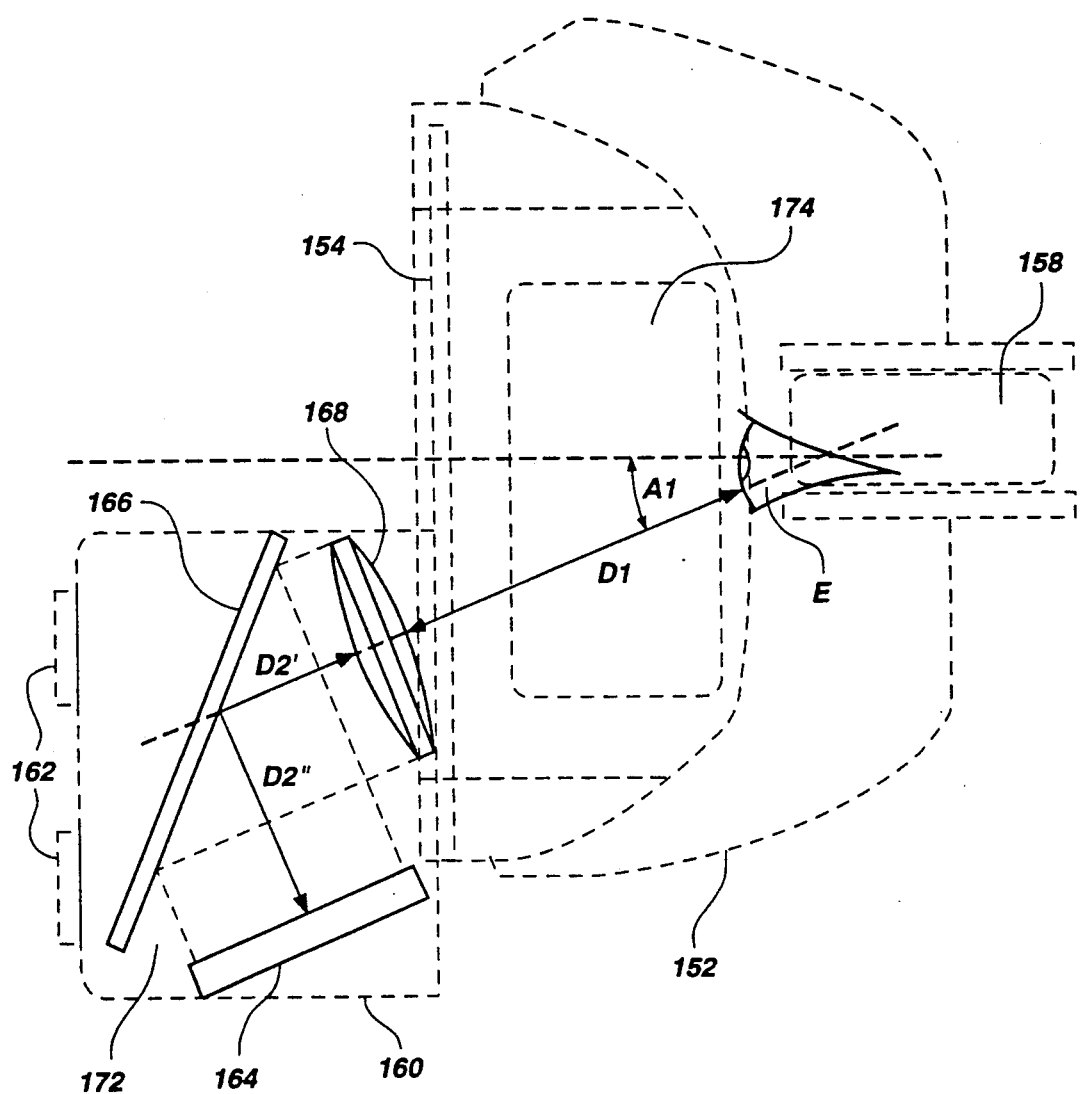
FIG. 7 is a side view of the optical display included in the embodiment illustrated in FIGS. 4A and 4B.

Referring next to FIG. 7, a more detailed diagrammatic representation of the field of view display system illustrated in FIGS. 4A and 4B is provided. The representation of FIG. 7 depicts the display device 160, a mirror 166, and a lens 168, all generally designated as a field of view display system at 172. It is to be understood that other components, such as a prism in place of mirror 166, can also be used within the scope of the present invention. As indicated earlier, the components represented in FIG. 7 are used to retrofit an existing scuba diving mask 152 with one preferred embodiment of the present invention. Because they are intended to retrofit an existing scuba mask, particular considerations must be addressed. Still, the of the same objects are achieved as with the other embodiments of the invention described herein.

In contrast to the display system represented in FIGS. 6A and 6B, when retrofitting an existing diving mask 152 with the present invention, the distance from the eye E to the display device 16 is greater than in the embodiment of FIGS. 6A and 6B. In FIG. 7, this characteristic is shown by the increase in the Distance $D_1$. Thus, it is necessary to increase the distance from the lens 168 to the display device 164 by a like amount as represented by the Distance $D_2$ (comprising $D_2'$ and $D_2''$).

In order to keep the display housing 160 a compact size, the Distance D₂ is folded by reflecting the light path from off the mirror 166. It will be appreciated that with the use of the reflected light path diagrammatically illustrated in FIG. 7, the dimensions of the display housing 160 are such that the display housing 160 remains compact. It is within the scope of the present invention to utilize other optical components which are now known in the art, or which become available in the future, to carry out the functions of the components represented in FIG. 7. For example, it is within the scope of the present invention to utilize fiber optics, or other technique, to convey an image to the eye E. In some circumstances, it may be desirable to utilize holographic techniques to convey information to the user.

The use of the mirror 166, or other reflecting surface, in the embodiment of FIG. 7 may cause the image of the display device 164 to be reversed and/or inverted. This reversal of the image can be readily resolved by properly driving the display device 164 so that the image presented to the user is correctly oriented. Also, the before described equations that govern the location of the image, as well as the magnification of the image, apply with the embodiment of FIG. 7.

It will be appreciated that embodiments of the present invention can be integrated into, or retrofit onto, many different types and styles of masks, both those used underwater and those used on land.

Figure 8:
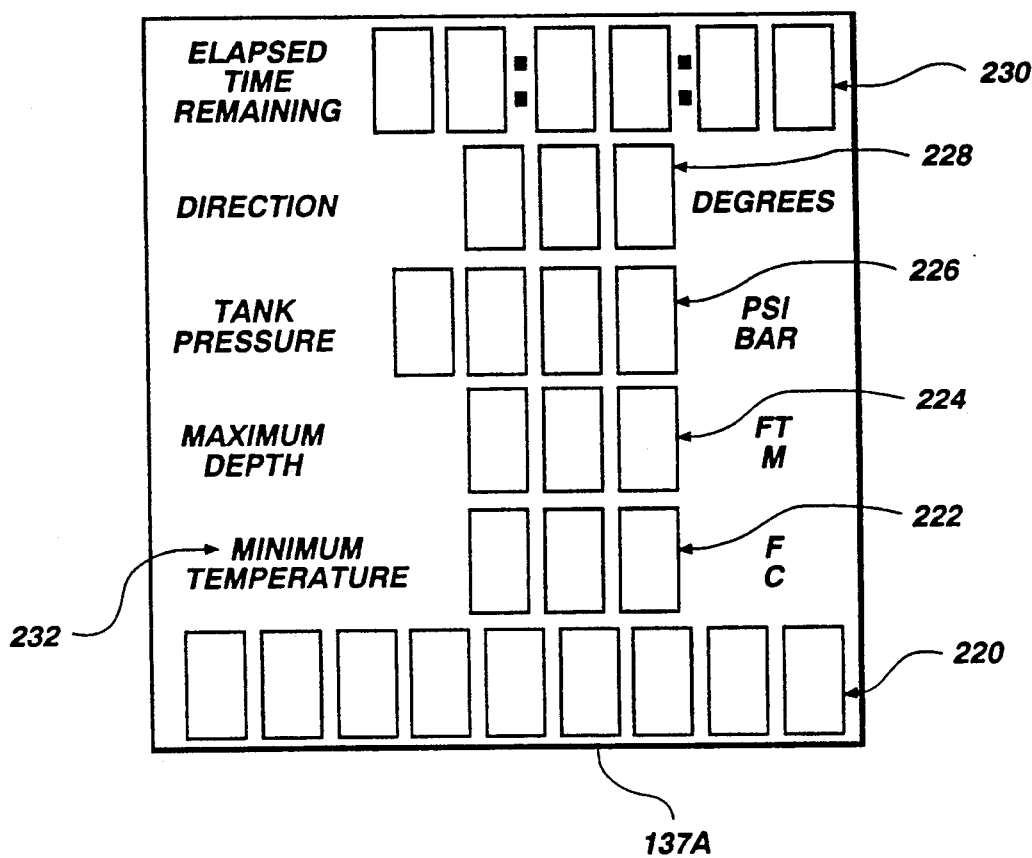
FIG. 8 illustrates one preferred arrangement of a visual device included in the display devices illustrated in FIGS. 6A, 6B, and 7.

FIG. 8 provides a front view of a representative embodiment of the electrical display device 137A illustrated in earlier figures. The display device can be based upon any one of a number of already available technologies or on those to be developed in the future. It is presently preferred that the display device 137A utilize light emitting diode technology so that the characters on the display are easily readable when the surrounding environment is dark.

The arrangement represented in FIG. 8 is one preferred design for conveying information to the user representing the variables and calculations from the microcomputer. The represented display device 137A preferably includes a visual array of characters arranged in marquis fashion, generally indicated at 220, whereupon alpha-numeric characters can be scrolled across the field of view of the user. Also represented in FIG. 8 are other character groups including: a minimum temperature/temperature array (including three characters generally indicated at 222) which can toggle between fahrenheit/centigrade; a maximum depth/current depth array (including three characters generally indicated at 224) which can toggle between feet/meters; a tank pressure array (including four characters generally indicated at 226) which can toggle between pounds per square inch(psi)/bar; a direction array (including three characters generally indicated at 228) which indicates the degrees from north the user is currently oriented; and, an elapsed time/time of day/time remaining array (including six characters generally indicated at 230).

In the case of the multi-purpose arrays, e.g., minimum temperature/temperature array 222, the operating icon is toggled to inform the user what information is being displayed, for example, the minimum temperature which has been encountered during the dive or merely the current temperature. In some cases, (the minimum temperature/temperature array 222, the maximum depth/current depth array 224, and the tank pressure array 226) can be toggled between metric or english units. The marquis array 220 is provided for the microcomputer and associated components to present messages regarding, for example, alarm conditions or other calculated variables such as the amount of decompression time remaining, decompression stop levels, or other useful information.

The elapsed time/time remaining array 230 can be toggled between displaying the time of day, the elapsed time of the dive, or a calculated time representing the estimated time remaining in the dive which takes into account the air remaining in the tank as well as decompression factors. It will be appreciated that the embodiments of the present invention, using the information gathered by the sensors described herein, can calculate critical decompression information in accordance with any number of algorithms or data tables which are available in the art. For example, representative decompression schemes can be found in the publication B. R. Wienke, *Basic Decompression Theory and Application* (Los Alamos National Laboratory) which is now incorporated herein by reference. Other useful information can be obtained from the publications A. A. Buhlmann, Decompression/Decompression Sickness (published by Springer-Verlag 1984) and P. B. Bennett, et al., *The Physiology and Medicine of Diving and Compressed Air Work* (published by Williams and Williams CO. 1969) which are also now incorporated herein by reference. Those skilled in the pertinent arts will readily be able to incorporate the necessary programming steps and/or hardware into embodiments of the present invention to utilize any one of a number of decompression calculations schemes.

The present invention preferably includes a means for timing an elapsed time of a dive, a means for calculating a safe assent rate, both of which can desirably be programmed into the microcomputer, and a means for displaying a safe assent rate within the diver's field of view so as to aid the diver in making safe, yet as long and as deep as possible, dives.

The direction array 228 represented in FIG. 8 shows the current compass heading of the user. Many users of the present invention regularly work under environmental conditions where they can readily become disoriented. Thus, being provided with a compass heading, showing horizontal orientation, is a great convenience and safety feature, and in the case of an underwater diver, providing a vertical orientation indicator (not represented in the figures) can also be desirable.

Figure 9A:
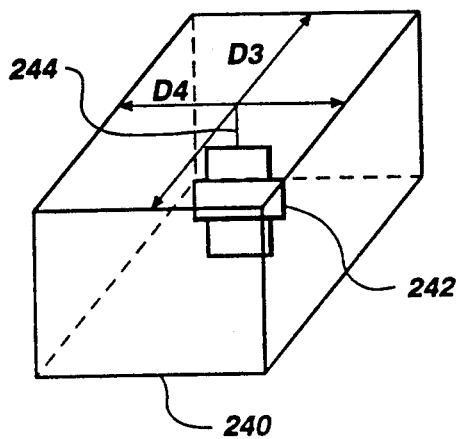
FIGS. 9A, 9B, and 9C are perspective, side, and front views, respectively, of a compass device preferably included in the embodiments of the present invention.
Figure 9B:
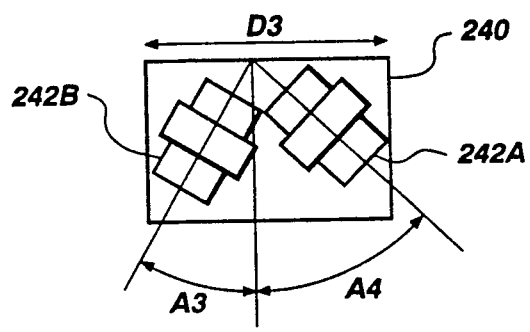
Figure 9C:
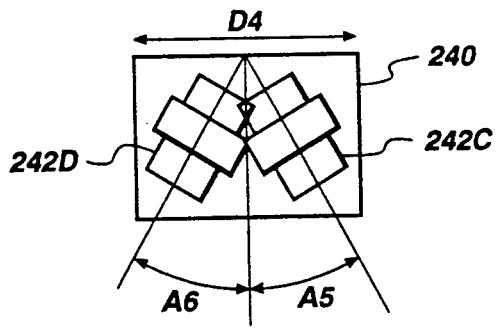
Figure 10A:
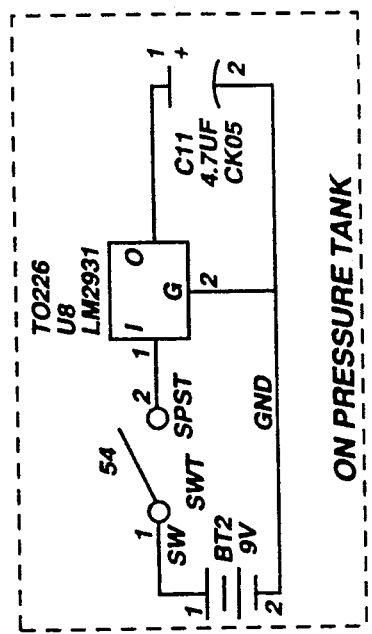
Figure 10B:
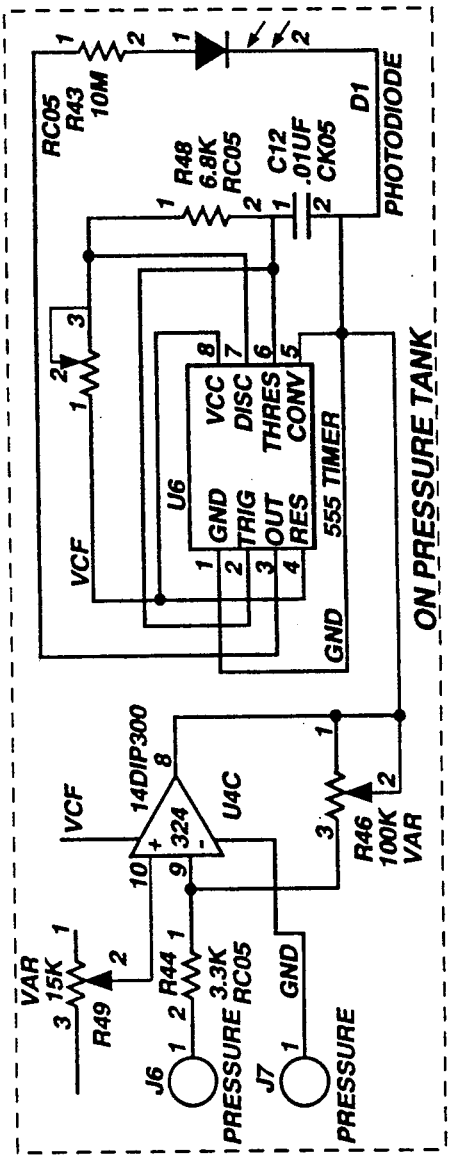
Figure 10C:
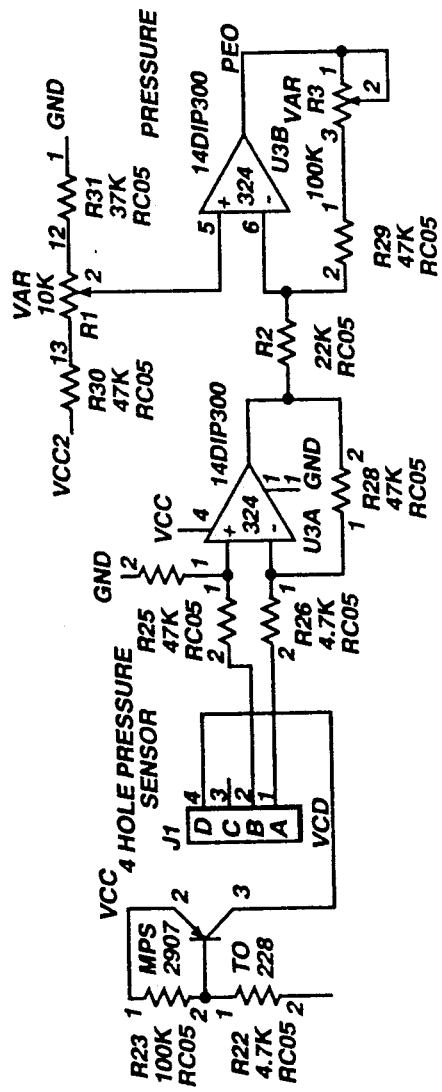
Figure 10D:
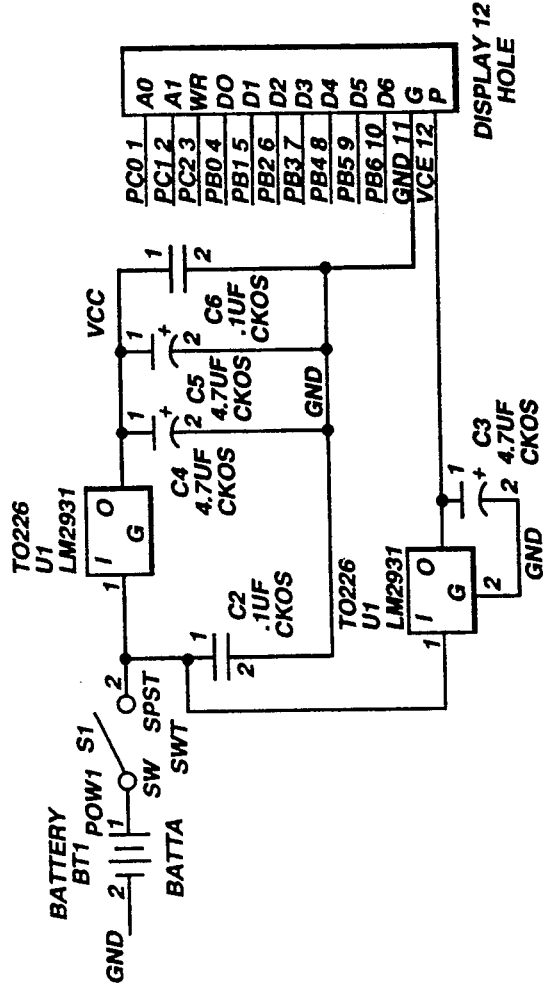
Figure 10G:
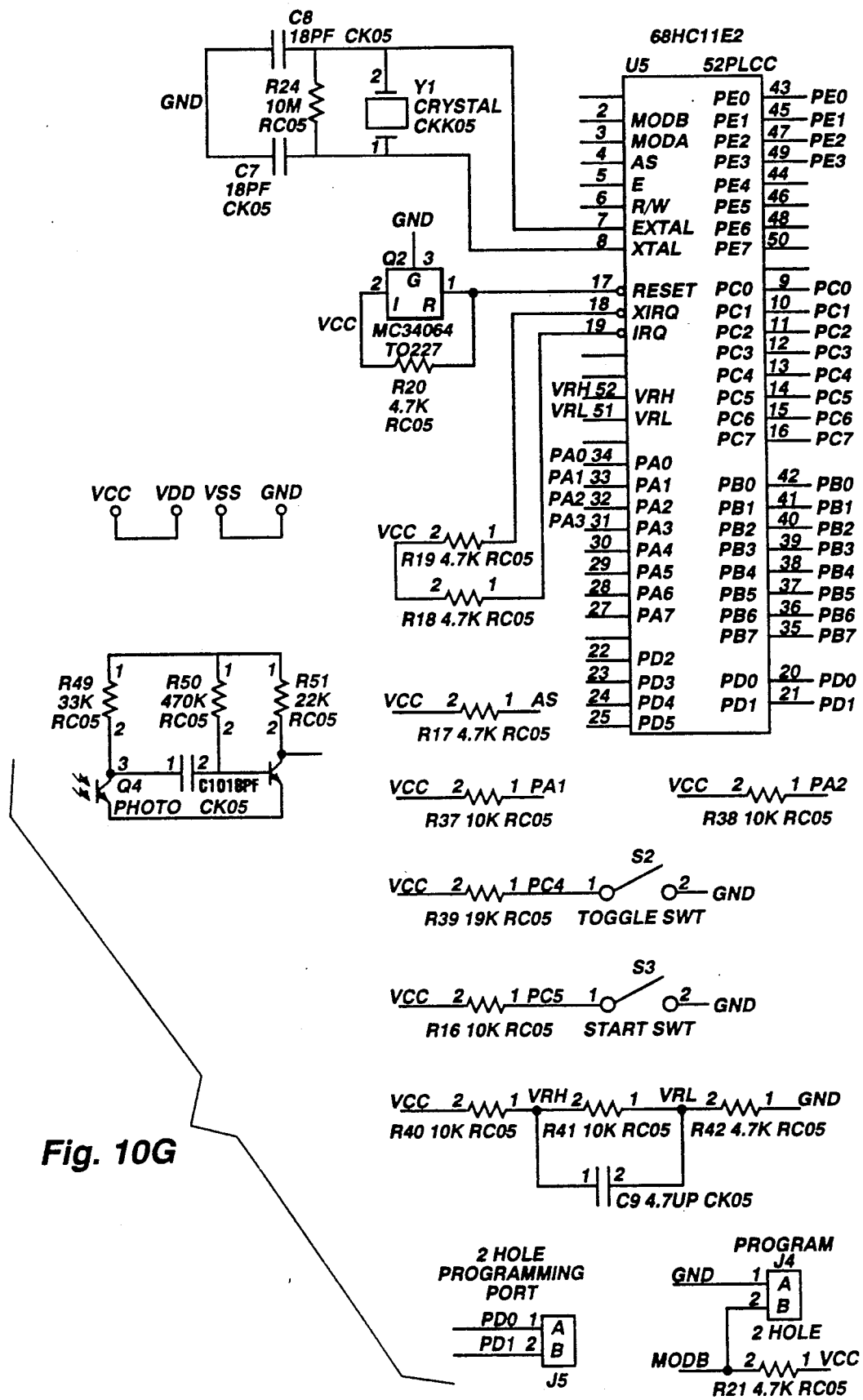

FIGS. 9A–9C diagrammatically depict the compass sensor which provides the compass heading data and which is the presently preferred embodiment of the compass sensor 108 represented in FIG. 2. Since the user, and particularly an underwater diver, will regularly position himself in a non-vertical orientation, the device used to determine the compass heading must be allowed to accurately operate when the diver orients his body so that the device is moved from a horizontal position.

In the preferred embodiment, a fluxgate device 242 is used as the compass sensor. It is to be understood that other devices can also be used within the scope of the present invention to detect changes in the relative orientation of the earth's magnetic field. The fluxgate device 242 operates by sensing changes in the earth's magnetic field as the relative orientation of the device changes. The fluxgate compass sensor is preferably one available from Dinsmore Instrument Company, Part no. 1525. In order to keep the fluxgate device 242 in a substantially horizontal orientation regardless of the orientation of the user, the fluxgate device 242 is suspended from a suspension member 244 within a housing 240. The suspension member 244 preferably is arranged so that the fluxgate device 242 will only be allowed to swivel and not rotate. It will be understood that if the fluxgate device 242 rotates with respect to the housing 240 (which is fixed to the user in some fashion) then inaccuracies will be introduced in the compass reading.

The housing 240 preferably comprises a small waterproof container which is filled with a dielectric solution. The suspension member 244 suspends the fluxgate device 242 in the dielectric fluid so that a substantially horizontal orientation is maintained as the user changes his orientation. The dielectric solution further provides a dampening effect against transient movements of the housing 240 so that the output does not rapidly change when small momentary movements are made. The dielectric solution is preferably one of the perfluorinated fluids available in the art which have the appropriate viscosity, density, and other desirable characteristics. Most preferable is one of the family of Fluorinert liquids available from Minnesota Mining and Manufacturing Co. (3M).

FIG. 9A will be referenced next. FIG. 9A illustrates two of the dimensions, $D_3$ and $D_4$, of the housing 240. It is to be understood that the housing 240 can be any one of a number of different shapes in addition to the rectangular shape illustrated in FIG. 9A. Since the orientation of a scuba diver is not vertical much of the time, the housing 240 can be fixed in an orientation such that it is substantially horizontal when the diver is in the most common orientation. The front-back Dimension $D_3$ of the housing 240 can preferably be longer than the side-side Dimension $D_4$ in order to accommodate the more common changes of orientation by the user/diver along the axis defined by Dimension $D_3$.

FIG. 9B provides a side view of the housing 240 along Dimension $D_3$ showing the position of the fluxgate device (at 242A) oriented at a first front-back Angle $A_4$ and the fluxgate device (at 242B) in a second front-back Angle $A_3$. FIG. 9C provides an end view of the housing 240 along Dimension $D_4$ showing the position of the fluxgate device (at 242C) oriented in a first side-side Angle $A_5$ and the fluxgate device (at 242D) in a second side-side Angle $A_6$. Those skilled in the art will understand that other structures which can carry out the above-described functions using the teachings contained herein.

FIGS. 10A–G provides a detailed schematic diagram of the electrical components of the presently preferred embodiment of the present invention. In order to increase the clarity of the diagram of FIGS. 10A–G, the reference designations customarily used in the art in such diagrams have been retained. Table A, below, provides a description of the components represented in FIGS. 10A–G. It is to be appreciated that the arrangement represented in FIGS. 10A–G is merely exemplary and the present invention can be embodied in many alternative forms which can be arrived at using the teachings contained herein.

TABLE A

| Reference Designation | Part |
| --- | --- |
| BT1 | BATTERY >5 V |
| BT2 | BATTERY >5 V |
| C1,C3,C4,C9,C11 | 4.7 UF |

TABLE A-continued

| Reference Designation | Part |
| --- | --- |
| C2,C6 | .1 UF |
| C5 | 4.7 |
| C7,C8,C10 | 18 PF |
| C12 | .01 UF |
| D1 | PHOTODIODE, OP77, TRW |
| J1 | PRESSURE SENSOR FOR DEPTH, MODEL FPB-04A, FUJIKURA |
| J2 | COMPASS - DINSMORE INSTRUMENT COMP., PART NO. 1525 |
| J3 | DISPLAY - HEWLETT PACKARD, HPDL 1414 |
| J4 | PROGRAM - JUMPER TO DOWNLOAD A NEW PROGRAM |
| J5 | PROGRAMMING PORT |
| J6,J7 | PRESSURE TRANSDUCER FOR TANK, NOVA SENSOR, NPI-15B-173SH |
| Q1 | MTS102 - MOTOROLA - TEMPERATURE SENSOR |
| Q2 | MC34064 - MOTOROLA |
| Q3 | 2N2907 - GENERIC |
| Q4 | LED, HIGH EFFICIENCY, 2 CANDELA, PANASONIC LNG1CAL(UR) OR HEWLETT PACKARD - 3950 |
| Q5 | 2N2222 |
| R1,R7,R10,R12, R16,R37,R38,R39, R40,R41,R47 | 10K |
| R2,R6,R8,R9,R11, R13,R34,R35,R36, R51 | 22K |
| R3,R14,R15,R23, R32,R33,R46 | 100K |
| R4,R25,R26,R27, R28,R29,R30 | 47K |
| R5 | 20K |
| R17,R18,R19,R20, R21,R22,R42 | 4.7K |
| R24,R43 | 10M |
| R31 | 37K |
| R44 | 3.3K |
| R45 | 15K |
| R48 | 6.8K |
| R49 | 33K |
| R50 | 470K |
| S1,S4 | SW SPST |
| S2 | MOMENTARY CLOSURE (TOGGLE) SWITCH |
| S3 | MOMENTARY CLOSURE START/STOP SWITCH |
| U1,U2,U8 | LM2931 NATIONAL SEMICONDUCTOR |
| U3,U4 | 324 NATIONAL SEMICONDUCTOR |
| U5 | 68HC11E2 MOTOROLA |
| U6,U7 | 555 TIMER GENERIC |
| Y1 | CRYSTAL, 8 MHZ GENERIC |
| FIBER OPTIC CABLE | AMP, TYPE 501232-1 |
| FIBER OPTIC CONNECTORS | RG59 COAX CONNECTORS WITH CABLE EPOXIED IN PLACE |
| LENS | 25 mm DIAMETER, FL = 25–40 mm |

Figure 11:
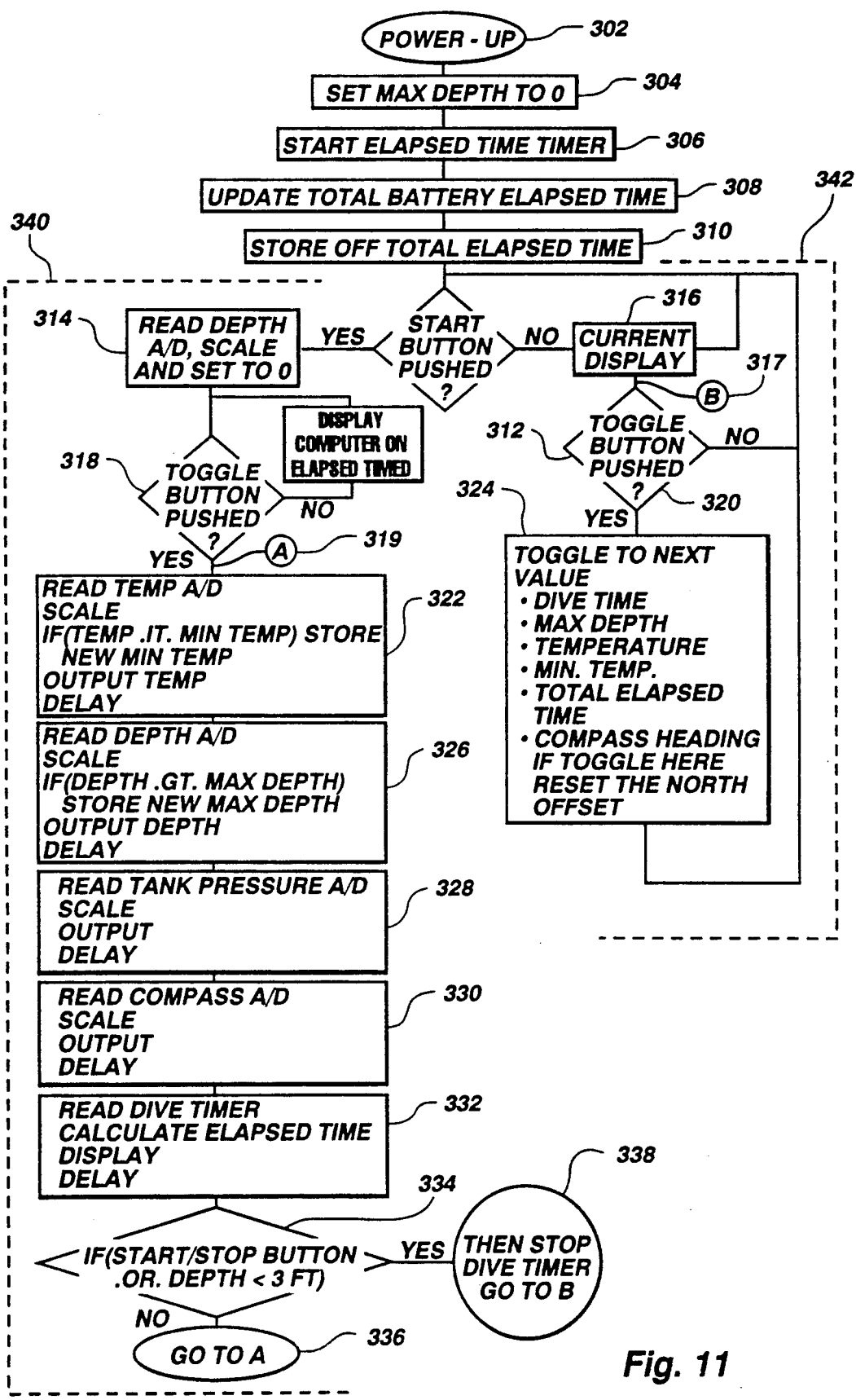
FIG. 11 is a flow chart representing the steps carried out by the described embodiments of the present invention.

Reference will next be made to FIG. 11 which is a flow chart representing the steps carried out by the embodiments of the present invention described herein being used by a scuba diver. While the scuba diving environment is the preferred application for the present invention, the present invention can also be used in many other applications such as those previously mentioned. It is to be understood that the steps set forth in the flow chart of FIG. 11 are merely representative of those which can be used to carry out the present invention, whether using the hardware herein described or other arrangements of components, either those presently available or which become available in the future.

Furthermore, the presently preferred example of programming code used to substantially implement the steps set forth in the flow chart of FIG. 11 is reproduced in the Programming Code Appendix attached hereto. The code contained in the Appendix is merely an example of an arrangement which can be used to operate the components embodying the present invention.

The preferred embodiments of the present invention possess two modes of operation: a "dormant mode" and a "dive-in-progress mode." The dormant mode is in effect when the diver is not engaged in an actual dive but the embodiment of the invention is powered up. The dive-in-progress mode is in effect when an actual dive is underway. The described embodiments are arranged so that the user is presented with the most advantageous combination of controls allowing flexibility and ease of use. Both ergonomics and ease of understanding should be given appropriate consideration when selecting how the user will interface with the input devices on the embodiment.

In the described preferred embodiments, three switch functions are needed for control of the embodiment. The switch functions can be carried out either by a single switch or by a plurality of manually actuated switches such as those represented in FIGS. 3A-3B at 146 and in FIGS. 4A-4B at 162. For example, in the steps described in the flow chart of FIG. 11, one switch is preferably a single-pole, single-throw (SPST) switch that causes the embodiment to turn on and off (power up and down). Second and third switches are momentary closure switches. The second switch is referred to as the start/stop switch and is actuated to signal the beginning or end of a dive or to perform some other function(s) as will be hereinafter explained. The third switch, preferably referred to as a display control switch, is actuated by the user to change parameters shown in the field of view display system hereinbefore described.

The start/stop switch is used to mark the time that a dive is begun or ended. If, after the embodiment is powered up, the start/stop switch is not actuated, then the system does not enter the dive-in-progress mode but remains in the dormant mode. Once the start/stop switch is actuated the user can scroll between the various embodiment and dive variables on the field of view display system and the embodiment is ready to enter the dive-in-progress mode.

The start/stop switch is actuated when a diver is ready to begin a dive. The embodiment of the present invention then monitors the depth of the diver under the surface of the water and transfers to the dive-in-progress mode once the depth is determined to be greater than a predetermine depth, for example, three feet. The dive-in-progress mode continues until the start/stop switch is pressed again or the depth is sensed to again be less than three feet. At this point the dormant mode is again entered. It will be appreciated that the embodiments of the present invention can be configured to eliminate the step of pressing the start/stop switch and enter the dive-in-progress mode and the dormant mode when appropriate depths are sensed.

Having explained the two modes of operation of the described embodiment of the present invention, further details will next be provided on the presently preferred steps carried out by the described embodiment by continued reference to FIG. 11.

Beginning at step 302, an on/off switch is actuated causing power to be applied to the embodiment's components. When power is applied, a startup routine is automatically invoked, the startup routine including initializing the required registers and system variables in the microcomputer (112 in FIG. 2A) and: (1) zeroing the maximum depth variable (step 304); (2) zeroing the elapsed time variable since the embodiment was last powered up and starting the elapsed time timer (step 306); (3) zeroing the dive elapsed time variable (4) zeroing the compass offset; and (5) setting the minimum temperature variable to a large value. The elapsed time since last power up is added to a cumulative total of the embodiment's powered up time and is stored in nonvolatile electrically erasable memory. This cumulative total of the embodiment's powered up time can be viewed while in the dormant mode as is described below. The off total elapsed time is also stored (step 310).

After the startup routine is completed, the embodiment checks to see if the start/stop switch has been actuated (step 312) and if not, then the embodiment begins operation in the dormant mode and the current display (step 316) shows a dive time of zero since the embodiment has just been powered up and no dive has taken place yet. When the on/off switch is set to off, the only variable that is not lost is the elapsed time since the embodiment was last powered up.

The dormant mode is entered after the embodiment is powered up or after the end of a dive. As explained, the end of a dive is marked either by the diver actuating the start/stop switch while in the dive-in-progress mode or the sensed depth decreasing to a level less than three feet. Once in the dormant mode the system displays the dive elapsed time and allows the user to toggle the display between other system parameters and historical dive information.

In the presently preferred arrangement set forth in FIG. 11, rather than the display device represented in FIG. 8, a single line alpha-numeric display device is used across which a plurality of variables and information can conveyed to the diver as indicated at step 324. The diver actuates the display control switch (a momentary on switch) to toggle between the following exemplary values: (1) last dive elapsed time; (2) the maximum depth of the last dive; (3) the current temperature; (4) the minimum temperature during the last dive; (5) the total elapsed time that the microcomputer has been powered up; and (6) the compass heading.

While in the dormant mode, the variable which is displayed within the diver's field of view remains unchanged until the diver toggles the display control switch again (step 320). Toggling the display control switch allow the diver to scroll the value of the next available variable across the display. If the display control (toggle) switch (button) is not pushed, control returns to step 312.

Additionally, while in the dormant mode the compass heading can be zeroed. The compass heading can be zeroed if desired since, when the embodiment is powered up, the compass sensor has no reference to any heading. Upon power up, the compass sensor arbitrarily establishes a zero degree heading and then reports changes in orientation relative to the zero degree heading. In this described embodiment, by actuating the start/stop switch when the compass heading is being displayed, whichever direction the compass sensor is oriented becomes the zero heading.

Desirably, the compass heading is zeroed at magnetic north, or true north, depending upon the preference of the user. To do this, the compass sensor is oriented in a north-south direction, compared to an independent reference magnetic compass such as a hand held compass, and then pressing the start/stop switch. This zeros the compass heading as described and also puts the system in the dive-in-progress mode. To return to the dormant mode the start/stop switch is pressed once again.

With continued reference to FIG. 11, the dive-in-progress mode will be explained in detail next. The steps carried out during the dive-in-progress mode are indicated by the dashed bracket 340. The steps carried out during the dormant mode are indicated by the dashed bracket 342. As will now be appreciated, the dive-in-progress mode is entered only when a combination of a manual and automatic actions are taken. First, the diver must mark the start of a dive by pressing the start/stop switch as indicated by the "yes" branch of step 312.

Next, as indicated at step 314, the microcomputer automatically reads the depth sensor and sets the current reading to zero depth and then, as indicated at step 318, waits for the dive depth to be greater than three feet. Alternatively, actuating the start/stop switch again will return the embodiment to the dormant mode. While waiting for the actual dive to begin (defined by the sensed depth being greater than three feet), the elapsed time in minutes since the embodiment was powered up is displayed.

Once the depth is determined to be greater than three feet, represented at Point A 319, the microcomputer reads and displays the following system and dive variables as represented by the subroutines represented in steps 322–332:
(1) current temperature (represented at 322 in FIG. 11);
(2) current dive depth (represented at 326 in FIG. 11);
(3) tank pressure (represented at 328 in FIG. 11);
(4) compass heading (represented at 330 in FIG. 11);
(5) dive elapsed time (represented at 332 in FIG. 11).

Each variable is preferably automatically displayed for three seconds on the display before the next variable is scrolled into the diver's field of view. By actuating the display control switch at any time while in the dive-in-progress mode, the currently displayed variable is held on the display, or if a variable is already held on the display, pressing the display control switch again starts the variables scrolling on the display again.

As indicated at step 334, the variables are continued to be scrolled across the display until either the start/stop switch is actuated or the sensed depth is reduced to less than three feet. If the start/stop switch is actuated or the sensed depth is reduced to less than three feet, the dive timer is stopped (as indicated at 338) and control moves to point B 317 in the flow chart of FIG. 11. If neither the start/stop switch is actuated nor the sensed depth is greater than three feet, control transfers back to point A 319 in the flow chart of FIG. 11. Once the dive has begun then the variables automatically scroll within the diver's field of view so that the diver can continually be made aware of all of the system and dive variables. It will be appreciated that the embodiments of the present invention provide a diver with important information in a manner which is more convenient and efficient, thus leading to safer diving conditions, than previously available.

It will be further appreciated that the microcomputer of the described embodiment can readily carry out calculations to determine necessary decompression steps for a diver utilizing any number of available decompression schemes. Information on useful decompression schemes is available in the earlier referenced publications and in the publications referenced in U.S. Pat. No. 4,882,678, cols. 1–2, which are now incorporated herein by reference. Using the teachings contained herein, those skilled in the art will readily be able to incorporate such decompression schemes into embodiments of the present invention so as to convey such needed information to the diver.

In view of the foregoing, it will be appreciated that the present invention provides a dive computer system which conveys important information to a diver in a safer and more efficient manner than previously available devices as well as efficiently conveying important information to the diver without diverting the diver's attention away from the surrounding environment. The present invention also provides a dive computer which does not present any hazardous high pressure hoses or consoles which can snag on, or get hung-up on, underwater objects and formations and which does not present any dangers to a diver such as the rupturing of a high pressure hose or severing of an electrical cable.

It will be further appreciated that the present invention provides a dive computer which is capable of providing a variety of needed and useful information to a diver without requiring the diver to divert his attention from the environment surrounding the diver, which includes a compass function, and which provides hands-free operation and which operates reliably when the diver is oriented in an of a number of orientations. The present invention further provides a dive computer which provides long operation on batteries and which presents continuously updated, in real time, important system and dive information within the diver's field of view. The present invention also can accommodate a variety of eyesight parameters, facial structures, and eye shapes and sizes.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

United States Patent Application of

Lynn B. Hales for

FIELD OF VIEW UNDERWATER, DIVING COMPUTER SYSTEM

PROGRAMMING CODE APPENDIX

```
PA      EQU     $1000
PC      EQU     $1003
PB      EQU     $1004
PD      EQU     $1008
PE      EQU     $100A
```

***************************************************

```
        ORG     $0000

WEEP    RMB     22      ;WRITE EE PROGRAM STORED IN RAM
FLG     RMB     1       ;8 FLAGS USED IN ROUTINES
FLGG    RMB     1       ;FLAG USED IN DISPLAY ROUTINE
FLGS    RMB     1       ;MODE B FLAG
ENCOD   RMB     1       ;PULSE OVERFLOW ACCUMULATION
PSI     RMB     2       ;COUNTS FROM PRESSURE TANK
SECOND  RMB     1
MINUTE  RMB     1       ;KEEP TRACK OF REAL TIME
TIMEM   RMB     1       ;KEEP TRACK OF MISC TIME
TIMEN   RMB     1       ;KEEP TRACK OF MISC TIME
TIMEO   RMB     1       ;KEEP TRACK OF MISC TIME
TIMEP   RMB     1       ;KEEP TRACK OF MISC TIME
COUNT   RMB     1       ;DETERMINE WHAT TO DISPLAY IN MODE B
COUNTS  RMB     1       ;STORAGE FOR COUNT PAST VALUES
CNTA    RMB     1       ;DETERMINE WHAT TO DISPLAY IN MODE A

G1      RMB     1
G2      RMB     1
G3      RMB     1
G4      RMB     1
G5      RMB     1       ;HOLD ASCII NUMBERS

S1      RMB     1
S2      RMB     1
S3      RMB     1
S4      RMB     1       ;GENERAL STORAGE

GN1     RMB     2
GN2     RMB     2
GN3     RMB     2
GN4     RMB     2       ;USED IN MATH ROUTINES
DIVR    RMB     4       ;32 DIVISION RESULT

DEGREE  RMB     2       ;NUMBER OF DEGREES FROM COMPASS
DEGREA  RMB     2       ;DEGREES WITHOUT OFFSET
OFFSET  RMB     2       ;OFFSET READING FOR COMPASS
TANKP   RMB     2       ;TANK PRESSURE
FEET    RMB     2       ;PRESSURE IN FEET OF WATER
OFFA    RMB     2       ;OFFSET FOR FEET OF WATER
FEETM   RMB     2       ;MAXIMUM DEPTH IN FEET
TEMPF   RMB     2       ;TEMPERATURE IN FAHRENHEIT
TEMPM   RMB     2       ;MINIMUM TEMPERATURE
DIVE    RMB     2       ;DIVE TIME IN MINUTES
TIM     RMB     2       ;ELASPED TIME SINCE INSTRUMENT ON
```

***************************************************

```
        ORG     $103F
        FCB     241     ;ENABLE WATCHDOG FOR HC811E2 241=F1
```

***************************************************

```
        ORG     $F800

IN      EQU     *
        LDX     #$1000
        CLRA
        STAA    $35,X           ;CLR BLOCK PROTECTION
        LDAA    #$03            ;USING 8 MEGAHERTZ CRYSTAL
        STAA    $39,X           ;1.049 SEC TIMEOUT COP RESET
        LDAA    #%10100010      ;ENABLE TIMER AND PULSE ACCUMLATOR INTERRUPT
        STAA    $24,X           ;PRESCALE OF 8 EACH TIMER BIT IS 4 USEC
```

```
        LDAA   #$40
        STAA   $22,X
        STAA   $23,X              ;ENABLE OUTPUT COMPARE 2 INTERRUPT

LDAA   #$0F
        STAA   $07,X              ;PC0-PC3 = OUTPUTS PC4-PC7 = INPUTS

LDS    #$FF        ;STACK POINTER
        LDAA   #%01001000  ;ENABLE PULSE ACCUMULATOR
        STAA   $26,X              ;MAKE PA3 AN OUTPUT
        JSR    RAMF        ;PUT WRITE EE MEMORY PROGRAM IN RAM
        CLR    MINUTE
        CLR    SECOND
        CLR    FLG         ;CLEAR TIME PARAMETERS ON BOOT UP
        CLR    COUNT       ;WHAT TO DISPLAY IN LOOP
        LDD    #0
        STAB   TIMEM       ;ZERO MAIN TIME
        STD    TIM         ;ELASPED TIME
        STD    FEETM       ;ZERO MAXIMUM DEPTH IN FEET
        STD    DIVE        ;ZERO DIVE TIME
        STD    OFFSET      ;ZERO COMPASS OFFSET
        STD    OFFA        ;OFFSET FOR FEET OF WATER
        LDD    #$FFFF
        STD    TEMPM              ;PUT MAXIMUM IN MIN TEMP

JSR    WATCH
        JSR    DLY100      ;DELAY 100 MSEC
        CLI
        JSR    RAMF

;****************************************************************
* MAIN LOOP

MAIN    JSR    WATCH
        BRCLR      FLG $01   MAIN1    ;JMP IF SECOND NOT GONE BY
        BCLR   FLG $01      ;CLEAR SECOND FLAG
        JSR    ATOD        ;READ ALL 4 CHANNELS
        JSR    PIT         ;GET TANK PRESSURE
        JSR    FOW         ;GET FEET OF WATER
        JSR    TEMP        ;GET TEMPERATURE
        JSR    COMP        ;GET COMPASS READING
        LDD    TEMPF              ;CURRENT TEMP
        CPD    TEMPM              ;MIN TEMP
        BCC    MAIN2              ;JMP IF CURRENT TEMP HIGHER
        STD    TEMPM              ;OTHERWISE UPDATE MIN TEMP
MAIN2   LDD    FEET        ;CURRENT DEPTH
        CPD    FEETM              ;COMPARE MAX DEPTH
        BCS    MAIN1              ;JMP IF CURRENT DEPTH < MAX DEPTH
        STD    FEETM              ;OTHERWISE UPDATE MAX DEPTH
MAIN1       BRCLR      FLG $02   MAIN3      ;JMP IF MINUTE NOT GONE BY
        BCLR   FLG $02         ;CLEAR MINUTE FLAG
        BRCLR      FLG $80 MAIN5 ;JMP IF NOT UPDATE DIVE TIME
        LDD    DIVE
        ADDD   #1
        STD    DIVE        ;UPDATE DIVE TIME
MAIN5   LDY    #TIME
        LDD    ,Y          ;GET TOTAL ELAPSED TIME
        CPD    #9999
        BCS    MAIN4              ;JMP IF DISPLAY NOT OUT OF RANGE
        LDD    #0          ;OTHERWISE ZERO AGAIN
MAIN4   ADDD   #1
        STD    GN1
        INY                ;LOW ADDRESS
        JSR    WRITEE      ;PUT IN LOW BYTE OF TOTAL ELAPSED TIME
        DEY                ;HIGH ADDRESS
        LDAB   GN1         ;GET HIGH BYTE
        JSR    WRITEE      ;PUT IN HIGH BYTE OF TOTAL ELAPSED TIME
MAIN3   JSR    TOGLE
        JSR    START
        BRCLR      FLG $04 MAINZ ;JMP IF NOT IN MODE A
        JMP    MODEA              ;DO MODE A STUFF
```

```
MAINZ    LDAB  TIMEM
     CMPB  #1
     BCC   MAIN77
     JMP   MAIN        ;JMP IF TIME UP TO DISPLAY
MAIN77   LDAB  #0
     STAB  TIMEM       ;CLEAR TIMER COUNTER
     BCLR  FLG $80     ;STOP DIVE TIMER
     BCLR  FLG $40     ;MAKE MODEA INIT AGAIN
     BCLR  FLG $20     ;MAKE NEW OFFSET FOR FEET OF WATER
     BCLR  FLG $10     ;ALLOW MODEA TO CYCLE
     CLR   CNTA        ;CLEAR MODEA COUNTER
     LDD   #0
     STD   OFFA        ;ZERO OUT FEET OF WATER OFFSET
     BRSET     FLGS $01 MAIN7
     CLR   COUNTS
     CLR   COUNT
     BSET  FLGS $01
MAIN7    LDX   DIVE
     LDAA  COUNT
     BEQ   DISP ;JMP AND DISPLAY DIVE TIME
     LDX   FEETM
     CMPA  #1
     BEQ   DISP ;JMP AND DISPLAY MAX DEPTH
     LDX   TEMPF
     CMPA  #2
     BEQ   DISP ;JMP AND DISPLAY TEMPERATURE
     LDX   TEMPM
     CMPA  #3
     BEQ   DISP ;JMP AND DISPLAY MIN TEMPERATURE
     LDX   TIME
     CMPA  #4
     BEQ   DISP ;JMP AND DISPLAY TOTAL ELAPSED TIME
     LDX   DEGREE
     CMPA  #5
     BEQ   DISP ;JMP AND DISPLAY COMPASS READING
DISP CLRA
     LDAB  COUNT
     ADDD  #ASCIIB
     XGDY              ;ADDRESS OF BYTE IN TABLE
     LDAA  ,Y
     STAA  G5          ;EXTRA CHARATER AT DISPLAY
     JSR   DISN
     JMP   MAIN
ASCIIB   FCC   'DXFMTC'
**************************************************************
*DO MODE A STUFF

MODEA    LDAA  COUNT
     CMPA  #5    ;SEE IF DISPLAY MODE FOR COMPASS FIRST TIME IN
     BNE   MODEA1
     LDD   DEGREA      ;LOAD COMPASS READING
     STD   OFFSET      ;STORE OFFSET FOR COMPASS
MODEA1   BRSET     FLG $40 MODEA2  ;JMP IF INIT STUFF DONE
     BRSET     FLG $20   MODEA3    ;JMP IF PUT IN OFFSET ONCE
     BCLR  FLGS $01
     CLR   COUNT       ;CLEAR MODE B COUNTER
     CLR   COUNTS
     LDD   FEET
     STD   OFFA ;PUT IN OFFSET UNTIL IN WATER
     BSET  FLG $20
MODEA3   JSR   FOW   ;GET FEET OF WATER
     LDD   FEET
     CPD   #3
     BCC   MODEA4      ;JMP IF 3 FEET OR >
     LDAB  TIMEN
     CMPB  #4
     BCS   MODEA5      ;JMP IF TIME NOT UP
     CLR   TIMEN       ;CLEAR TIMER
     LDX   TIM
     LDAA  #'E'
     STAA  G5
     JSR   DISN ;DISPLAY ELAPSED TIME
```

```
MODEA5     JSR  DLY100
           JMP  MAIN
MODEA4     BCLR FLG $20    ;CLEAR ONE TIME OFFSET INDICATOR
           BSET FLG $40    ;SET INIT DONE INDICATOR
           LDD  #0
           STD  DIVE ;CLEAR DIVE TIME
           BSET FLG $80    ;SET FLG TO START RECORDING DIVE TIME
           LDAB #40
           STAB TIMEN
MODEA2     LDD  FEET
           CPD  #3
           BCC  MODEA8     ;JMP IF 3 FEET OR >
           BCLR FLG $04    ;CLEAR MODE A WHICH WILL CLEAR DIVE TIMER

MODEA8     EQU  *
           LDAA COUNT
           SUBA COUNTS
           BEQ  MODA10
           BCC  MODA11     ;JMP IF POSITIVE
           LDAA COUNTS
           SUBA COUNT
MODA11     CMPA #2
           BCS  MODA12     ;JMP IF KEEP SAME VALUE
           LDAA COUNT
           STAA COUNTS    ;RESET COUNTERS
           BCLR FLG $10
           INC  CNTA
           LDAA CNTA
           CMPA #5
           BCS  MODEA6     ;JMP IF UNDER 5
           CLR  CNTA
           BRA  MODEA6
MODA12     BRSET    FLG $10 MODA10 ;JMP IF BEEN THROUGH ONCE
           BSET FLG $10
           DEC  CNTA
           LDAA CNTA
           CMPA #255
           BNE  MODA10     ;JMP IF NO ROLL OVER
           LDAA #4
           STAA CNTA

MODA10     LDAB TIMEN
           CMPB #8   ;40/4=10 SECONDS EACH NUMBER TO DISPLAY
           BCC  MODEA6     ;JMP IF TIME UP
           JMP  MAIN
MODEA6     LDAB #0
           STAB TIMEN
           LDX  TEMPF
           LDAA CNTA ;SEE WHICH NUMBER TO DISPLAY
           BEQ  DISPA      ;JMP AND DISPLAY TEMP
           LDX  FEET
           CMPA #1
           BEQ  DISPA      ;JMP AND DISPLAY DEPTH
           LDX  TANKP
           CMPA #2
           BEQ  DISPA      ;JMP AND DISPLAY TANK PRESSURE
           LDX  DEGREE
           CMPA #3
           BEQ  DISPA      ;JMP AND DISPLAY COMPASS HEADING
           LDX  DIVE
           CMPA #4
           BEQ  DISPA      ;JMP AND DISPLAY DIVE TIMER
DISPA      CLRA
           LDAB CNTA
           ADDD #ASCIIA
           XGDY      ;ADDRESS OF BYTE IN TABLE
           LDAA ,Y
           STAA G5   ;EXTRA CHARATER AT DISPLAY
           JSR  DISN
           BRSET    FLG $10 MODEA7
           INC  CNTA
           LDAA CNTA
```

```
        CMPA  #5
        BCS   MODEA7      ;JMP IF UNDER 5
        CLR   CNTA
MODEA7  JMP   MAIN
ASCIIA  FCC   'FYPCD'

****************************************************************
*READ SWITCHES

START   LDAA TIMEO
        CMPA #6
        BCS  STARTE
        LDAA PC
        ANDA #$10
        BNE  STARTE       ;JMP IF HIGH OR START NOT PRESSED
        CLR  TIMEO
        BRCLR    FLG $04 START1
        BCLR FLG $04      ;TAKE OUT OF MODE A
        BRA  STARTE
START1  BSET FLG $04      ;PUT IN MODE A
STARTE  RTS

TOGLE   LDAA TIMEP
        CMPA #3
        BCS  TOGLEE
        LDAA PC
        ANDA #$20
        BNE  TOGLEE       ;JMP IF HIGH OR TOGGLE NOT PRESSED
        CLR  TIMEP
        INC  COUNT
        LDAA COUNT
        CMPA #6
        BCS  TOGLE1       ;JMP IF < 6
        LDAA #0
TOGLE1  STAA     COUNT
TOGLEE  RTS

****************************************************************
*WRITE TO EEPROM, ON ENTRY B CONTAINS DATA, Y IS ADDRESS TO WRITE TO

WRITEE  SEI
        PSHY
        LDAA #$40
        STAA $1039        ;TURN ON RC OSCILATOR
        JSR  DLY10        ;10 MSEC DELAY
        LDAA #$16 ;SET UP TO ERASE MEMORY
        JSR  $0
        PULY
        PSHY
        LDAA #$02 ;SET UP TO PROGRAM MEMORY
        JSR  $0
        LDAA #0
        STAA $1039        ;TURN OFF RC OSCILATOR
        PULY
        CLI
        RTS

****************************************************************

RAMF  PSHX
        LDX  #DATA        ;FILL RAM WITH PROGRAM AT DATA
        LDY  #WEEP
RAMF1   LDAA ,X
        STAA ,Y
        INX
        INY
        CMPA #$FF
        BNE  RAMF1
        PULX
RAMFE   RTS
```

```
DATA FCB  $B7,$10,$3B     ;STAA    $103B    SET UP FOR ERASE ($16)
*                                           OR PROGRAM ($02)
     FCB  $18,$E7,$00     ;STAB    $00,Y    STORE IN EEPROM
     FCB  $7C,$10,$3B     ;INC $103B        TURN ON HIGH VOLTAGE
     FCB  $18,$CE,$0B,$2A ;LDY #$0B2A    2858 * .5 USEC * 7 = 10 MSEC
     FCB  $18,$09         ;DEY              FOR 8 MEGA CYCLE
     FCB  $26,$FC         ;BNE $FC  JMP BACK -4 BYTES (3 CYCLES)
     FCB  $7F,$10,$3B     ;CLR $103B
     FCB  $39,$FF         ;RTS             FF IS MARKER

***********************************************
*SHIFT 4 PLACES LEFT DECIMAL POINT

SHIFT     LDAA #4
SHIFT1    LSL  GN4
     ROL  GN3+1
     ROL  GN3
     DECA
     BNE  SHIFT1
     RTS

***********************************************
*CALCULATE PRESSURE IN TANK

PIT  LDD  PSI  ;TANK COUNTS
     SUBD #8500
     BCC  PIT1
     LDD  #0
PIT1 STD  GN1  ;8500 COUNTS APPROX = 0 PSI
     LDD  #4096     ;10000 COUNTS APPROX = 1500 PSI  10000-8500=1500
     STD  GN2  ;1500 / 1500 = 1 * 4096 = 4096
     JSR  XMUL ;GN3 GN4 = XX XX X.X XX
     JSR  SHIFT
     LDD  GN3
     CPD  #3001
     BCS  PIT2 ;JMP IF UNDER 3001 PSI
     LDD  #3000
PIT2 STD  TANKP     ;TANK PRESSURE IN PSI
     RTS

***********************************************
*CALCULATE FEET OF WATER

FOW. LDAB $1031    ;READ PRESSURE SENSOR ATOD CONVERSION
     CLRA      ;Y=A+BX   B=SLOPE=(65-14)/(255-0)=.20
     STD  GN1  ;A=Y-BX= 14-.208*0 = 14
     LDD  #13107    ;255 APPROX = 65 PSI    0 = 14 PSI
     STD  GN2  ;.20 * 65536 = 13107 = SLOPE OF LINE
     JSR  XMUL ;GN3 GN4 = XX XX . XX XX
     LDD  GN3
*    ADDD #14  ;ADD A
*    SUBD #14  ;SUBTRACT 14 PSI BECAUSE OF ATMOSPHERE
*    BCC  FOW1
*    LDD  #0
FOW1 STD  GN1  ;STORE PSI OF SENSOR
     LDD  #9175     ;CONVERT TO FEET 2.24 FEET/PSI
     STD  GN2
     JSR  XMUL ;2.24 * 4096 = 9175
     JSR  SHIFT     ;GN3 GN4 = XX XX X.X XX
     LDD  GN3
     SUBD OFFA ;OFFSET SUBTRACTION
     BCC  FOW2
     LDD  #0
FOW2 STD  FEET ;PRESSURE IN FEET OF WATER
     RTS

***********************************************
*CALCULATE TEMPERATURE

TEMP LDAB $1032    ;READ TEMPERATURE ATOD CONVERSION
     CLRA      ;Y=A+BX  B=SLOPE=(90-45)/(255-0)=.177
```

```
        STD   GN1      ;A=Y-BX= 45-.177*0 = 45
        LDD   #11600      ;255 APPROX = 90 FAHR   0 = 45 FAHR
        STD   GN2      ;.177 * 65536 = 11600 = SLOPE OF LINE
        JSR   XMUL   ;GN3 GN4 = XX XX . XX XX
        LDD   GN3
        ADDD  #45    ;ADD A
        STD   TEMPF    ;CONTAINS TEMP IN FAHR
        RTS

***************************************************
*DO ATOD CONVERSION ON ALL 4 CHANNELS PE0,PE1,PE2,PE3
*LOCATIONS $1031,$1032,$1033,$1034 CONTAIN RESULTS FROM
*PE0,PE1,PE2,PE3 RESPECTIVILY

ATOD  LDX   #$1000
      BCLR  $03,X $08 ;TURN ON POWER TO COMPASS
      JSR   DLY10         ;10 MSEC DELAY
      LDAA  #$C0
      STAA  $39,X     ;TURN ON ATOD CONVERSION USING INTERNAL RC OSC
      LDAA  #$10
      STAA  $30,X         ;DO MULTIPLE CHANNEL CONVERSION ONE TIME
ATOD1    BRCLR   $30,X $80 *    ;WAIT UNTIL CONVERSION FINISHED
      LDAA  #0
      STAA  $39,X         ;TURN OFF ATOD
      BSET  $03,X $08 ;TURN OFF POWER TO COMPASS
      RTS

***************************************************
*DISPLAY 16 BIT NUMBER IN X

DISN  JSR   BINASC
DISNC    LDX   #G1+3
      LDAA  #3     ;DISPLAY ADDRESS A0=1 A1=1 HIGHEST DIGIT
      STAA  S1
      CLR   FLGG
DISN1 LDAA  ,X
      CMPA  #'1'
      BCC   DISN2      ;JMP IF > THAN ASCII 0
      CPX   #G1
      BEQ   DISN2      ;IF LAST CHARTER DISPLAY
      LDAA  #$70 ;BLANK CHARACTER
      BRSET    FLGG $01 DISNCC
      LDAA  G5    ;EXTRA ASCII CHARACTER
DISNCC   JSR   DISPWA   ;PUT OUT CHAR TO DISPLAY
      LDAA  #1
      STAA  FLGG ;SET FLAG
      DEC   S1
      DEX
      BRA   DISN1
DISN2    JSR  .DISPW    ;DISPLAY CHARACTER
      DEC   S1
      DEX
      CPX   #G1-1
      BNE   DISN2      ;JMP UNTIL ALL CHARACTERS DISPLAYED
      RTS

*ACCA CONTAINS DATA TO WRITE S1 CONTAINS ADDRESS

DISPW    LDAA  ,X    ;GET CHARACTER
DISPWA   STAA  PB
      LDAA  PC
      ANDA  #$FC ;CLEAR ADDRESS BITS
      ORAA  S1
      STAA  PC    ;PUT OUT ADDRESS CODE
      ANDA  #$FB
      STAA  PC    ;DISPLAY WRITE LINE LOW
      ORAA  #$04
      STAA  PC    ;DISPLAY WRITE LINE HIGH
      RTS

***************************************************
*16 BIT BINARY IN X,  G1,G2,G3,G4 ASCII  G4 MSB
```

```
BINASC    LDY   #G1
     CLR  G4
BIN2 LDAA #48
     STAA ,Y
     INY
     LDAA G4
     CMPA #48
     BNE  BIN2
     XGDX
     LDY  #G1+3
     LDX  #BINT+6
BIN3 CPD  ,X
     BCC  BIN1
     CPX  #BINT
     BEQ  BINOUT
     DEX
     DEX
     DEY
     BRA  BIN3
BIN1 SUBD ,X
     INC  ,Y
     BRA  BIN3
BINOUT    RTS

BINT FDB  1,10,100,1000

***************************************************************
*1 MSEC DELAY

DLY1 PSHX
     LDX  #333 ;333 * 3 USEC = 1 MSEC
DLY2 DEX       ;1.5 USEC
     BNE  DLY2 ;1.5 USEC
     PULX
     RTS

*10 MSEC DELAY

DLY10     PSHX
     LDX  #3333
DLY11     DEX
     BNE  DLY11
     PULX
     RTS

*100 MSEC DELAY

DLY100    PSHX
     LDX  #33333
DLY101    DEX
     BNE  DLY101
     PULX
     RTS

***************************************************************
*TIMER OVERFLOW INTERRUPT

TIMER     EQU  *
*    LDD  TIM  ;EACH TIM BIT = 262.14 MSEC
*    ADDD #1
*    STD  TIM
     LDAA #$80
     STAA $1025   ;RESET TIMER OVERFLOW FLAG
TIMEE     RTI

***************************************************************
*RESET WATCHDOG TIMER

WATCH     EQU  *
     LDAA #$55
     STAA $103A   ;SET COP
     LDAA #$AA
```

```
        STAA $103A      ;RESET COP
        RTS

****************************************************************
*16 X 16 MULTIPLY GN1 X GN2 = GN3,GN4   GN3 HI WORD GN4 LO WORD

XMUL    PSHA
        PSHB
        LDD  #0
        STD  GN3
        LDAA GN1+1
        LDAB GN2+1
        MUL
        STD  GN4
        LDAA GN1+1
        LDAB GN2
        MUL
        ADDD GN3+1
        STD  GN3+1
        BCC  XMU10
        INC  GN3
XMU10   LDAA GN1
        LDAB GN2+1
        MUL
        ADDD GN3+1
        STD  GN3+1
        BCC  XMU20
        INC  GN3
XMU20   LDAA GN1
        LDAB GN2
        MUL
        ADDD GN3
        STD  GN3
XMU50   PULB
        PULA
        RTS

************************************************************
*GET ENCODER COUNTS

LENCD   LDAA ENCOD
        LDAB $1027
        CMPA ENCOD     ;CHECK AND SEE IF INTERRUPT
        BNE  LENCD     ;OCCURED SINCE READING $1027
        RTS

************************************************************
*PULSE ACCUMULATOR OVERFLOW INTERRUPT

PAIE INC ENCOD         ;INCREMENT ENCODER HIGH COUNT
     LDAA #$20
     STAA $1025        ;CLEAR PAOVF
     RTI

************************************************************
*DETERMINE COMPASS READING

COMP EQU  *
     CLR  S1      ;S1 QUADRANT INDICATOR
     CLR  GN3+1
     CLR  GN3     ;S2 CONTAINS DEGREE OFFSET
     CLR  S3      ;S3 INDICATOR IF ABOVE 45 DEGREES
     LDAA $1033        ;CURVE 1
     SUBA #128 ;SEE IF ABOVE MIDPOINT
     BCC  COMP1   ;JMP IF POSITIVE
     BSET S1 $02  ;INDICATE CURVE 1 NEGATIVE
     LDAA #128
     SUBA $1033
COMP1   STAA G1   ;CURVE ONE ABSOLUTE VALUE
     LDAA $1034   ;CURVE 2
     SUBA #128 ;SEE IF ABOVE MIDPOINT
     BCC  COMP2   ;JMP IF POSITIVE
```

```
        BSET S1 $01    ;INDICATE CURVE 2 NEGATIVE
        LDAA #128
        SUBA $1034
COMP2   STAA G2        ;CURVE 2 ABSOLUTE VALUE
        LDAA S1
        CMPA #1
        BEQ  COMP3     ;JMP IF QUAD 1
        JSR  DEGA ;ADD 90 DEGREES
        CMPA #0
        BEQ  COMP4     ;JMP IF QUAD 0
        JSR  DEGA ;ADD 90 DEGREES
        CMPA #2
        BEQ  COMP3     ;JMP IF QUAD 2
        JSR  DEGA ;ASSUME IN QUAD 3
COMP4   JSR  DIVL2
        CMPB G1
        BCS  COMP5     ;JMP IF CURVE 1 HIGHER
        JSR  DIVL1
        INC  S3   ;45 DEGREE INDICATOR
COMP5   JSR  FRAC ;CALCULATE DEGREES
        STD  DEGREE    ;STORE DEGREES
        STD  DEGREA
        SUBD OFFSET
        BCC  COMP7     ;JMP IF POSITIVE
        LDD  #360
        SUBD OFFSET
        ADDD DEGREE
COMP7   STD  DEGREE
        RTS
COMP3   JSR  DIVL1
        CMPB G2
        BCS  COMP6     ;JMP IF CURVE 2 HIGHER
        JSR  DIVL2
        INC  S3   ;45 DEGREE INDICATOR
COMP6   BRA  COMP5

FRAC FDIV
        XGDX           ;ACCA CONTAINS TANGENT FRACTION
        LDX  #FDIVT    ;TABLE ADDRESS
        CLRB
FRAC2   CMPA ,X   ;ACCA CONTAINS FDIV RESULT
        BCS  FRAC1     ;JMP IF FOUND DEGREE
        ADDB #5
        INX
        CPX  #FDIVT+10
        BCS  FRAC2
        LDAB #45  ;DO NOT ALLOW ANYTHING OVER 45
FRAC1   LDAA S3   ;45 DEGREE INDICATOR
        BEQ  FRAC3     ;JMP IF DEGREES 45 OR BELOW
        LDAA #90
        SBA
        TAB
FRAC3   CLRA
        ADDD GN3  ;ADD IN QUADRANT DEGREES
        RTS       ;ACCX CONTAINS NUMBER OF DEGREES
FDIVT   FCB  $0D,$23,$3B,$53,$6C,$88,$A6,$C8,$EE,$FF
*        3   8   13  18  23  28  33  38  43  45   DEGREES
DIVL1   CLRA
        LDAB G2
        XGDX      ;CURVE2 IN X
        CLRA
        LDAB G1   ;CURVE1 IN ACCX
        RTS
DIVL2   CLRA
        LDAB G1
        XGDX      ;CURVE1 IN X
        CLRA
        LDAB G2   ;CURVE2 IN ACCX
        RTS
DEGA PSHA
        LDD  GN3
        ADDD #90  ;ADD 90 DEGREES TO RESULT
```

```
        STD  GN3
        PULA
        RTS

***********************************************************
*OUTPUT COMPARE INTERRUPT 2

OUTC2   EQU  *
        LDD  #62500      ;62500 * 4 = 250000 USEC = 1/4 SECOND
        ADDD $1018
        STD  $1018       ;MAKE INTERRUPT OCCUR EVERY 1/4 SECOND
        LDAB TIMEM
        ADDB #1
        STAB TIMEM       ;AUX TIME CONTROL
        LDAB TIMEN
        ADDB #1
        STAB TIMEN       ;AUX TIME CONTROL
        LDAB TIMEO
        ADDB #1
        CMPB #250
        BCC  OUTD1       ;DO NOT LET RISE ABOVE 250
        STAB TIMEO       ;AUX TIME CONTROL
OUTD1   LDAB TIMEP
        ADDB #1
        CMPB #250
        BCC  OUTD2       ;DO NOT LET RISE ABOVE 250
        STAB TIMEP       ;AUX TIME CONTROL
OUTD2   LDAA MINUTE
        ADDA #1
        STAA MINUTE      ;KEEP TRACK OF MINUTES
        CMPA #240
        BCS  OUTCB       ;JMP IF LESS THAN A MINUTE
        LDD  TIM
        ADDD #1
        STD  TIM         ;ELASPED TIME IN MINUTES
        CLR  MINUTE
        BSET FLG $02     ;SET FLAG INDICATE ONE MINUTE GONE BY
OUTCB   LDAA SECOND
        ADDA #1
        STAA SECOND      ;KEEP TRACK OF SECONDS
        CMPA #4
        BCS  OUTCA       ;JMP IF LESS THAN A SECOND
        CLR  SECOND
        BSET FLG $01     ;SET FLAG INDICATE ONE SECOND GONE BY
        LDAB $1027       ;TOTAL COUNTS
        LDAA ENCOD
        STD  PSI         ;STORE PRESSURE
        CLR  $1027
        CLR  ENCOD
OUTCA   LDAA #$40
        STAA $1023       ;CLEAR OUT COMPARE FLAG 2
        RTI

***********************************************************

ORG  $FFBE
TIME FDB $0000           ;RECORD RUNNING TIME IN EEPROM EVERY MINUTE

***********************************************************

ORG  $FFD6

FDB  IN   ;SCI RS232        $FFD6
        FDB  IN   ;SPI $FFD8
        FDB  IN   ;PAIE    PULSE ACCUMULATOR INPUT EDGE   $FFDA
        FDB  PAIE ;PAO PULSE ACCUMULATOR OVERFLOW    $FFDC
        FDB  TIMER     ;TO TIMER OVERFLOW           $FFDE
        FDB  IN   ;TIC4    TIMER INPUT CAP 4        $FFE0
        FDB  IN   ;TOC4    TIMER OUT COMPARE 4      $FFE2
        FDB  IN   ;TOC3    $FFE4
        FDB  OUTC2     ;TOC2     $FFE6
        FDB  IN   ;TOC1    $FFE8
```

```
FDB    IN    ;TIC3    TIMER INPUT CAP 3    $FFEA
FDB    IN    ;TIC2    $FFEC
FDB    IN    ;TIC1    $FFEE
FDB    IN    ;RTI REAL TIME INT    $FFF0
FDB    IN    ;IRQ $FFF2
FDB    IN    ;XIRQ    $FFF4
FDB    IN    ;SWI $FFF6
FDB    IN    ;IOT ILLEGAL OPCODE TRAP $FFF8
FDB    IN    ;COPF    $FFFA
FDB    IN    ;COPM    $FFFC
FDB    IN    ;RESET
$FFFERE^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z
^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z
^Z^Z^Z^Z^Z^Z^Z^Z^Z^Z^Z^Z^Z^Z^Z^Z^Z^Z^Z^Z^Z^Z^Z^Z^Z
```

What is claimed and desired to be secured by U.S. Letters Patent is:

1. A system for providing needed information to a user wearing a mask or a mask-like structure comprising a substantially transparent viewing area providing the wearer a field of view of the surrounding environment, the system comprising:
    means for sensing the value of at least one measured parameter comprising means for sensing at least one of the user's physiological variables;
    means for processing information received from the means for sensing and outputting a display signal;
    means for generating a visually perceptible image representing the display signal;
    means for presenting an image of the visually perceptible image within the wearer's field of view and for placing the image at a focus distance in the range from about six inches to about infinity in relation to the eye of the user such that the wearer is able to view the visually perceptible image within the field of view; and
    means for holding the means for generating and the means for presenting in proximity to the mask.

2. A system for providing needed information to a user wearing a mask as defined in claim 1 wherein the means for sensing the value of at least one measured parameter comprises means for sensing the user's heart rate.

3. A system for providing needed information to a user wearing a mask as defined in claim 1 wherein the means for sensing the value of at least one measured parameter further comprises means for sensing at least the environmental variable.

4. A system for providing needed information to a user wearing a mask as defined in claim 3 wherein the means for sensing the value of at least one measured parameter comprises means for sensing the depth under the surface of a body of water the user is submerged.

5. A system for providing needed information to a user wearing a mask as defined in claim 1 wherein the mask comprises a diving mask.

6. A system for providing needed information to a user wearing a mask as defined in claim 5 wherein the means for sensing the value of at least one measured parameter comprises means for sensing the underwater depth the user is submerged.

7. A system for providing needed information to a user wearing a mask as defined in claim 6 wherein the means for sensing the value of at least one measured parameter further comprising means for sensing the pressure in at least one tank holding a breathable gas supplied to the diver and for generating a tank pressure signal and wherein the means for processing is further for processing the tank pressure signal.

8. A system for providing needed information to a user wearing a mask as defined in claim 7 wherein the means for sensing comprises an ambient temperature sensor.

9. A system for providing needed information to a user wearing a mask as defined in claim 6 wherein the means for sensing the pressure and the means for processing are housed separately and wherein the system further comprises means for establishing a communication link between the means for processing and the means for sensing the pressure.

10. A system for providing needed information to a user wearing a mask as defined in claim 9 wherein the means for establishing a communication link comprises a fiber optic cable.

11. A system for providing needed information to a user wearing a mask as defined in claim 5 further comprising means for detecting changes in the relative orientation of the earth's magnetic field and generating a compass signal with respect to its relative orientation in the earth's magnetic field and wherein the means for processing is further for processing the compass signal.

12. A system for providing needed information to a user wearing a mask as defined in claim 11 wherein the means for detecting changes in the relative orientation in the earth's magnetic field comprises a compass device.

13. A system for providing needed information to a user wearing a mask as defined in claim 11 further comprising means for maintaining the compass device in substantially the same orientation in one plane as the user moves.

14. A system for providing needed information to a user wearing a mask as defined in claim 13 further comprising a water tight housing containing the compass device suspended in a liquid.

15. A system for providing needed information to a user wearing a mask as defined in claim 11 wherein the means for presenting comprises means for visually conveying to the user at least some of the information contained in the compass signal.

16. A system for providing needed information to a user wearing a mask as defined in claim 5 wherein the means for presenting comprises a display device and means for maintaining the focus distance of the display device away from the diver's eye at least as great as six inches.

17. A system for providing needed information to a user wearing a mask as defined in claim 16 wherein the focal distance away from the diver's eye is at least as great as one yard.

18. A system for providing needed information to a user wearing a mask as defined in claim 16 further comprising means for magnifying the image of the display device.

19. A system for providing needed information to a user wearing a mask as defined in claim 16 further comprising means for illuminating the display device.

20. A system for providing needed information to a user wearing a mask a defined in claim 16 wherein the means for presenting comprises:
   visual array means for providing a visually perceptible representation of the information conveyed by the display signal;
   means for placing an image of the visual array means at a focus distance in the range from about six inches to about infinity in relation to the eye of the diver; and
   means for magnifying the actual image of the visual array means such that the diver can readily observe the image of the visual array means.

21. A system for providing needed information to a user wearing a mask as defined in claim 20 wherein the means for magnifying the actual image of the visual array means magnifies the actual image in the range from about 10 percent to about 250 percent.

22. A system for providing needed information to a user wearing a mask as defined in claim 20 wherein the means for placing an image of the visual array means at a focus distance and the means for magnifying the actual image of the visual array means comprise at least one mirror and at least one lens.

23. A system for providing needed information to a user wearing a mask as defined in claim 20 wherein the means for placing an image of the visual array means at a focus distance and the means for magnifying the actual image of the visual array means comprise at least one lens.

24. A system for providing needed information to a user wearing a mask as defined in claim 5 wherein the means for presenting further comprises a housing, the housing being configured to be positioned adjacent to the outer surface of a lens of the mask.

25. A system for providing needed information to a user wearing a mask as defined in claim 1 wherein the means for presenting an image further comprises means for magnifying the image.

26. A system for providing needed information to a user wearing a mask as defined in claim 25 wherein the means for presenting an image comprises at least one lens.

27. A system for providing needed information to a user wearing a mask as defined in claim 1 wherein the means for processing comprises a microcomputer.

28. A system for providing needed information to a user wearing a mask as defined in claim 1 wherein the means for generating a visually perceptible image comprises a solid state array device.

29. A system for providing needed information to a user wearing a mask as defined in claim 1 further comprising a fiber optic cable connecting the means for processing and the means for generating.

* * * * *